(12) United States Patent
Babu et al.

(10) Patent No.: US 9,367,601 B2
(45) Date of Patent: Jun. 14, 2016

(54) COST-BASED OPTIMIZATION OF CONFIGURATION PARAMETERS AND CLUSTER SIZING FOR HADOOP

(71) Applicant: Duke University, Durham, NC (US)

(72) Inventors: Shivnath Babu, Durham, NC (US); Herodotos Herodotou, Durham, NC (US)

(73) Assignee: Duke University, Durham, NC (US)

( * ) Notice: Subject to any disclaimer, the term of this patent is extended or adjusted under 35 U.S.C. 154(b) by 31 days.

(21) Appl. No.: 13/843,347

(22) Filed: Mar. 15, 2013

(65) Prior Publication Data

US 2013/0254196 A1  Sep. 26, 2013

Related U.S. Application Data

(60) Provisional application No. 61/615,433, filed on Mar. 26, 2012.

(51) Int. Cl.
*G06F 17/30* (2006.01)
*G06F 7/00* (2006.01)
*G06F 11/34* (2006.01)
*G06F 9/50* (2006.01)

(52) U.S. Cl.
CPC ........ *G06F 17/30595* (2013.01); *G06F 9/5066* (2013.01); *G06F 11/3404* (2013.01); *G06F 11/3409* (2013.01); *G06F 11/3419* (2013.01); *G06F 11/3442* (2013.01); *G06F 11/3457* (2013.01); *G06F 11/3466* (2013.01); *G06F 11/3428* (2013.01); *G06F 11/3452* (2013.01); *G06F 2201/865* (2013.01)

(58) Field of Classification Search
USPC ........................................................ 707/736
See application file for complete search history.

(56) References Cited

U.S. PATENT DOCUMENTS

| | | | | |
|---|---|---|---|---|
| 8,209,664 B2* | 6/2012 | Yu | ............................ | H04L 12/44 717/119 |
| 2011/0154350 A1* | 6/2011 | Doyle | .................... | G06F 9/5044 718/104 |
| 2011/0173410 A1* | 7/2011 | Castillo | ............... | G06F 11/3442 711/170 |
| 2011/0307899 A1* | 12/2011 | Lee | ........................ | G06F 9/5027 718/104 |
| 2011/0314031 A1* | 12/2011 | Chittar | ................. | G06F 17/3025 707/749 |
| 2012/0297145 A1* | 11/2012 | Castillo | ............... | G06F 12/0868 711/138 |
| 2013/0024412 A1 | 1/2013 | Gong et al. | | |
| 2013/0104140 A1* | 4/2013 | Meng | ..................... | G06F 9/5066 718/104 |
| 2013/0167151 A1* | 6/2013 | Verma | .................... | G06F 9/5066 718/102 |
| 2013/0219068 A1* | 8/2013 | Ballani | ................. | G06F 9/5061 709/226 |
| 2013/0318538 A1* | 11/2013 | Verma | ........................ | G06F 9/50 718/104 |

* cited by examiner

*Primary Examiner* — Kuen Lu
(74) *Attorney, Agent, or Firm* — Olive Law Group, PLLC

(57) ABSTRACT

Cost-based optimization of configuration parameters and cluster sizing for distributed data processing systems are disclosed. According to an aspect, a method includes receiving at least one job profile of a MapReduce job. The method also includes using the at least one job profile to predict execution of the MapReduce job within a plurality of different predetermined settings of a distributed data processing system. Further, the method includes determining one of the predetermined settings that optimizes performance of the MapReduce job. The method may also include automatically adjusting the distributed data processing system to the determined predetermined setting.

13 Claims, 14 Drawing Sheets

COST-BASED OPTIMIZATION OF CONFIGURATION PARAMETERS AND CLUSTER SIZING FOR HADOOP

CROSS REFERENCE TO RELATED APPLICATION

This application claims the benefit of U.S. Provisional Patent Application No. 61/615,433, filed Mar. 26, 2012 and titled COST-BASED OPTIMIZATION OF CONFIGURATION PARAMETERS AND CLUSTER SIZING FOR HADOOP, the disclosure of which is incorporated by reference in its entirety.

FEDERALLY SPONSORED RESEARCH OR DEVELOPMENT

The technology disclosed herein was made with government support under grant numbers 0964560 and 0917062 entitled "Simplifying Database Management with Automated Experimentation" and "Integrated Problem Diagnosis and Repair in Databases and Storage Area Networks," respectively, and awarded by the National Science Foundation (NSF). The United States government may have certain rights in the technology.

TECHNICAL FIELD

The present disclosure relates to data processing. More particularly, the present disclosure relates to cost-based optimization of configuration parameters and cluster-sizing for distributed data processing systems.

BACKGROUND

Timely and cost-effective analytics over large datasets is now a crucial requirement in many businesses and scientific disciplines. Web search engines and social networks log every user action. The logs are often analyzed at frequent intervals to detect fraudulent activity, to find opportunities for personalized advertising, and to improve website structure and content. Scientific fields, such as biology and economics, have fast growing computational subareas.

The MapReduce framework—which includes a programming model and a scalable and fault-tolerant run-time system—is now a popular platform for data analytics. HADOOP® software, available from Apache Software Foundation, is an open source implementation of MapReduce used in production deployments. HADOOP® software is used for applications such as log file analysis, Web indexing, report generation, machine learning research, financial analysis, scientific simulation, and bioinformatics.

Cloud platforms make MapReduce an attractive proposition for small organizations that need to process large datasets, but they lack the computing and human resources of large companies or other organizations. Elastic MapReduce, for example, is a hosted service on the Amazon Web Services cloud platform where a user can instantly provision a HADOOP® cluster running on any number of Elastic Compute Cloud (EC2) nodes. The cluster can be used to run data-intensive MapReduce jobs, and then terminated after use. The user must pay for the nodes provisioned to the cluster for the duration of use.

It is desired to provide improved techniques for analyzing and managing large datasets. Further, it is desired to improve the performance and management of MapReduce jobs and distributed data processing systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are cost-based optimization of configuration parameters and cluster sizing for distributed data processing systems. According to an aspect, a method includes receiving one or more measures of performance of a MapReduce job. The method also includes determining a job profile based on the measures of performance. Further, the method includes providing the job profile for one or both of user interface and prediction processes.

According to another aspect, a method includes receiving one or more job profiles of a MapReduce job. The method also includes using the job profile to predict execution of the MapReduce job within a predetermined setting of a distributed data processing system. Further, the method includes determining performance of the MapReduce job based on the prediction.

According to another aspect, a method includes receiving one or more job profiles of a MapReduce job. The method also includes using the job profile to predict execution of the MapReduce job within different predetermined settings of a distributed data processing system. Further, the method includes determining one of the predetermined settings that optimizes performance of the MapReduce job. The distributed data processing system may be automatically adjusted to the determined setting.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

In accordance with embodiments, systems and methods are disclosed for providing MapReduce users and applications with good performance in distributed data processing systems. The systems and methods disclosed herein can provide improved performance automatically, or provide the user with the ability to control settings for improving performance in a system that uses MapReduce.

Figure 1:
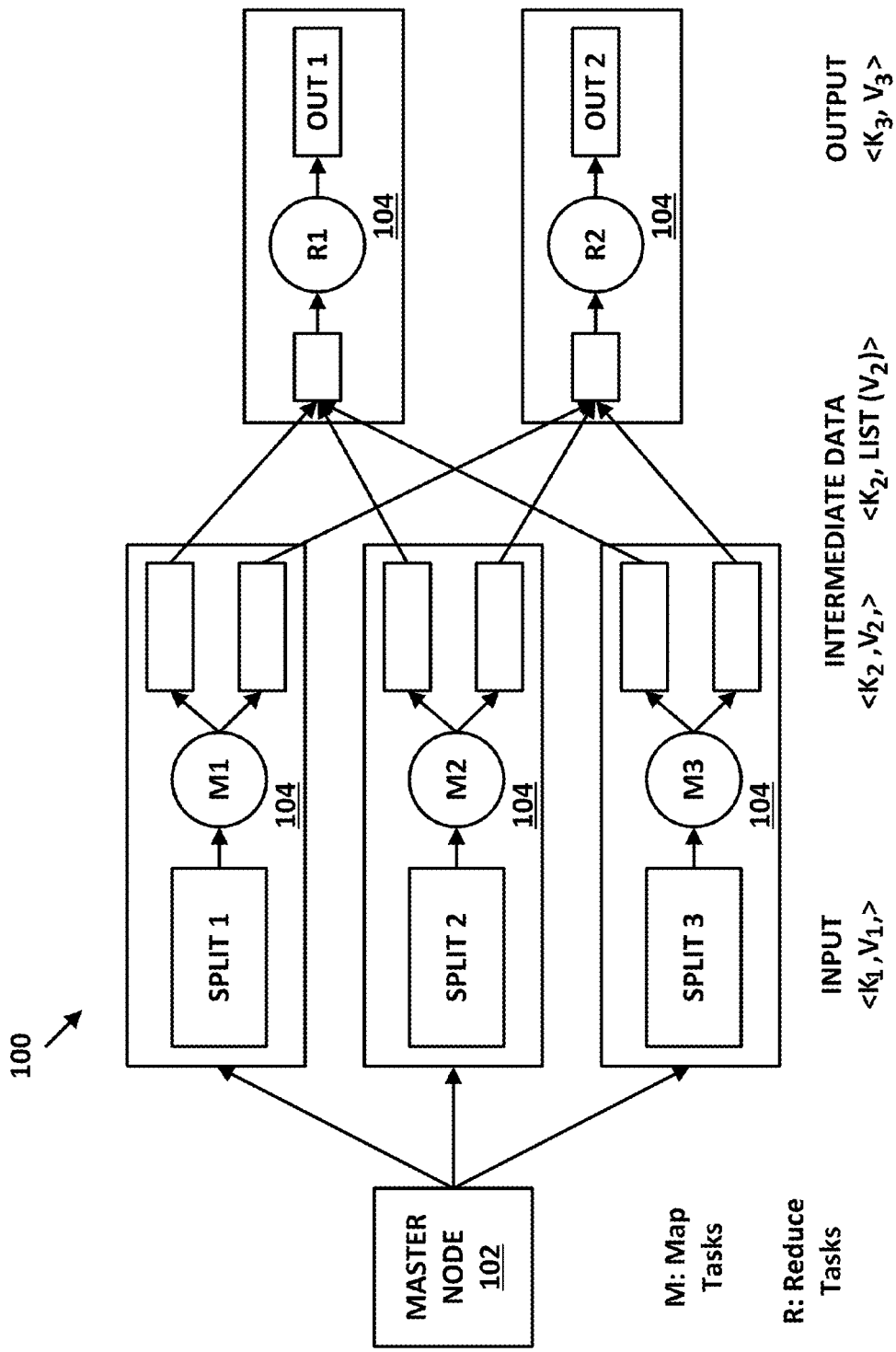
FIG. 1 is a block diagram of a distributed data processing system on which a MapReduce job is being executed.

FIG. 1 is a block diagram of a distributed data processing system 100 that implements a MapReduce model. Referring to FIG. 1, the system 100 implements the MapReduce model to manage large datasets. Each node of the system 100 represents a processor-based device or "machine" that may be embodied in a computer, workstation, server, client, mobile communication device, smartphone, tablet computer, laptop computer, or any other processor-based computing device. Each machine may include a central processing unit (CPU) for execution of software instructions, and may include or be coupled to memory and one or more data stores. Each machine may also execute resident programs or applications embodying client and/or server side functions in accordance with embodiments of the present disclosure.

MapReduce is a distributed computing model that processes large datasets on clusters of computers in parallel. It provides a programming model where users can specify a map function that processes a key-value pair to generate a set of intermediate key-value pairs, and a reduce function that merges all intermediate values associated with the same intermediate key. Particularly, the model includes a map($k_1$, $v_1$) function and a reduce($k_2$, list($v_2$)) function. Users can implement their own processing logic by specifying a custom map( ) and reduce( ) function written in a general-purpose language such as Java or Python. The map($k_1$, $v_1$) function is invoked for every key-value pair $\langle k_1, v_1 \rangle$ in the input data to output zero or more key value pairs of the form $\langle k_2, v_2 \rangle$, which is shown in FIG. 1. The reduce($k_2$, list($v_2$)) function is invoked for every unique key $k_2$ and corresponding values list($v_2$) in the map output. reduce($k_2$, list($v_2$)) outputs zero or more key-value pairs of the form $\langle k_3, v_3 \rangle$. The MapReduce programming model also allows other functions such as (i) partition($k_2$), for controlling how the map output key-value pairs are partitioned among the reduce tasks, and (ii) combine ($k_2$, list($v_2$)), for performing partial aggregation on the map side. The keys $k_1$, $k_2$, and $k_3$ as well as the values $v_1$, $v_2$, and $v_3$ can be of different and arbitrary types.

In an example, a HADOOP® MapReduce cluster employs a master-slave architecture where one master node 102 (referred to as "JobTracker") manages a number of slave nodes 104 (referred to as "TaskTrackers"). FIG. 1 shows how a MapReduce job is executed on the cluster. HADOOP® launches a MapReduce job by first splitting (logically) the input dataset into input splits. Each input split is then scheduled to at least one TaskTracker node and is processed by a map task. A "Task Scheduler" schedules the execution of map tasks while taking data locality into account. Each TaskTracker has a predefined number of task execution slots for running map (reduce) tasks. If the job executes more map (reduce) tasks than there are slots, then the map (reduce) tasks can run in multiple waves. When map tasks complete, the run-time system groups all intermediate key-value pairs using an external sort-merge algorithm. The intermediate data is then shuffled (i.e., transferred) to the Task Trackers scheduled to run the reduce tasks. The reduce tasks can process the intermediate data to produce the results of the job. It is noted that although many of the examples provided herein use HADOOP®, the presently disclosed subject matter may be similarly applied to any suitable MapReduce implementation or system.

In accordance with embodiments, a MapReduce job j=<p, d, r, c> can run a MapReduce program p on input data d and cluster resources r using configuration parameter settings c. The MapReduce program p may be written directly in terms of map and reduce functions by a user, or generated from workflows or queries specified in languages such as, but not limited to, HiveQL and Pig Latin programming languages. The input dataset d is typically stored in a distributed data processing system.

As an example, FIG. 1 shows computer cluster resources that can run a MapReduce program p as a MapReduce job. The job configuration c may include parameters such as, but not limited to, the number of map and reduce tasks, the partitioning function, settings for memory-related parameters, use of compression, the use of map-side combiners, and the like.

In accordance with embodiments, tuning controls to optimize performance of a MapReduce job j=<p, d, r, c> are present in each one of p, d, r, and c. For example, if p represents a join operation, then a map-side join or a reduce-side join can be done by using different choices of map and reduce functions in p. The data layout can be tuned by using partitioning, compression, row-based or column-based layouts, and the like. The cluster resources can be tuned, for example, by choosing suitable machine types and number of machines.

The job configuration can be tuned, for example, by adjusting the number of map and reduce tasks.

Achieving good performance from a MapReduce system can be a non-trivial exercise due to the large number of tuning controls present in the system. As described in more detail herein, the presently disclosed subject matter provides MapReduce users and applications with good performance automatically, without the need on their part to understand and manipulate tuning controls.

The presently disclosed subject matter can assist MapReduce users with answering their questions and addressing problems of a MapReduce system. An example question of a MapReduce user may be: How will the execution time of job j change if I increase the number of reduce tasks from the current value of 20 to 40? As another question, a user may ask: What is the new estimated execution time of a HiveQL query Q if 5 more nodes are added to the cluster, bringing the total to 20 nodes? In another question, a user may ask: How will the execution time of my MapReduce program written using the R programming language change when I execute it on the production cluster instead of the development cluster, and the input data size increases by 60%? In another question, a user may ask: What is the estimated execution time of job j if I execute j on a new cluster with 10 EC2 nodes of type m1.large rather than the current in-house cluster? In another question, a user may ask: How many reduce tasks should be used in my HiveQL query if I want it to finish as quickly as possible on my production HADOOP® cluster? In another example, a user may query for recommendation of the best setting of job-level and cluster-level tuning controls to run her Pig Latin query within 10 minutes. In another example, a user may desire for a selection of the best setting of all tuning controls and to run her MapReduce jobs automatically so that all jobs complete within 1 hour while incurring the least cost on the Amazon cloud. In another question, a user may ask: Why is my MapReduce job taking more than 2 hours to complete? The presently disclosed subject matter can help users address these and other questions.

Figure 2:
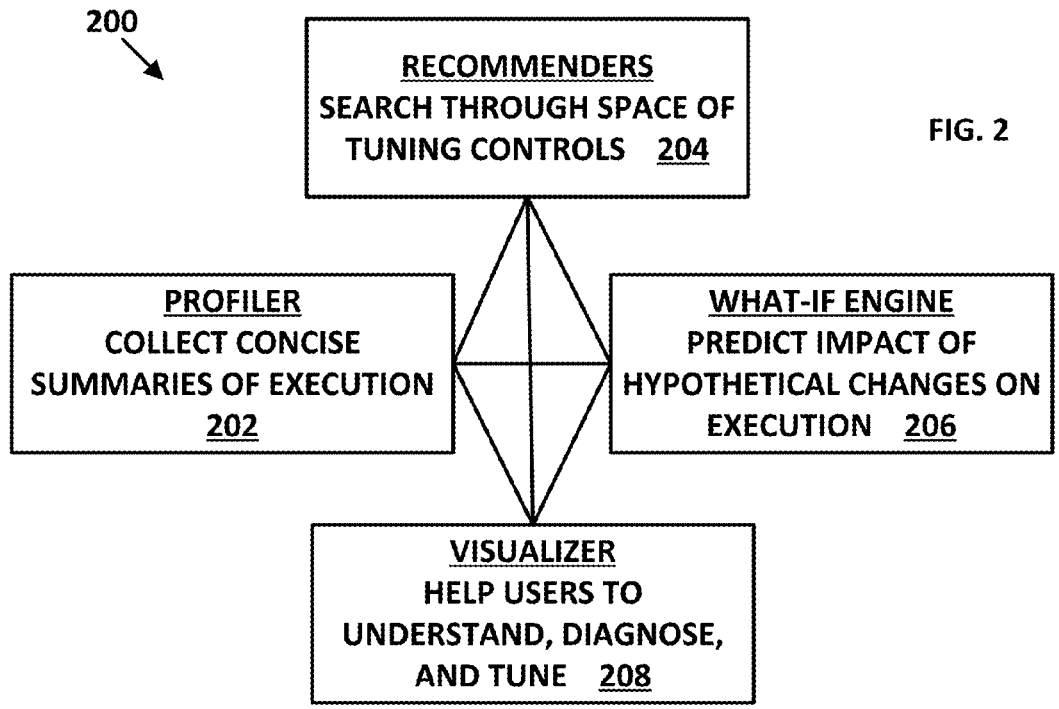
FIG. 2 is a block diagram of an example system for implementing functions in accordance with the presently disclosed subject matter.

FIG. 2 illustrates a block diagram of an example system 200 for implementing functions in accordance with the presently disclosed subject matter. The system 200 may utilize a profile-predict-optimize approach to assist MapReduce users and applications with questions and systems about a MapReduce system, such as the example system shown in FIG. 1. The system 200 may comprise multiple modules including a profiler 202, recommenders 204, and a what-if engine 206, and a visualizer 208. The system 200 may be implemented by suitable software, hardware, firmware, or combinations thereof. For example, the system 200 may be implemented by one or more processors and memory. Further, the system 200 may reside on a node within a distributed data processing system or on a computing device or server located remote from the system.

Figure 3:
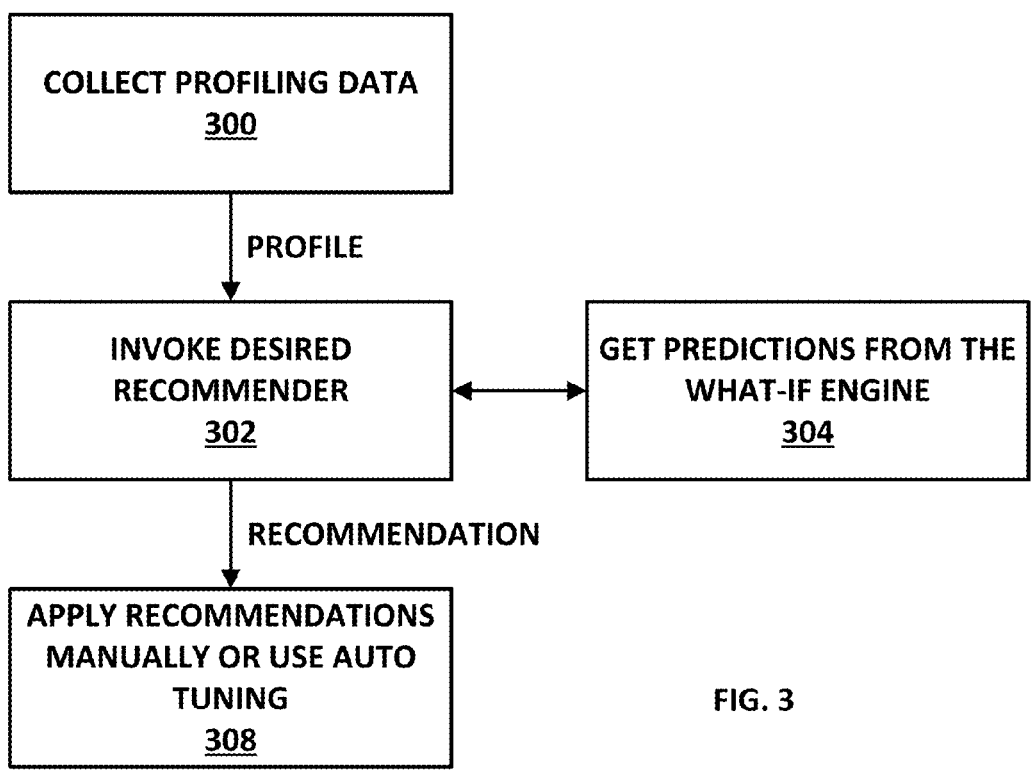
FIG. 3 is a flowchart of an example method that may be implemented by the system shown in FIG. 2 in accordance with embodiments of the present disclosure.

FIG. 3 illustrates a flowchart of an example method that may be implemented by the system 200 shown in FIG. 2 in accordance with embodiments of the present disclosure. Alternatively, the method of FIG. 3 may be implemented by any suitable system, computing device, or collection of computing devices. The method may be implemented for a MapReduce user or application to get good performance, without any need on their part to understand and manipulate the numerous controls in a MapReduce system. Referring to FIG. 3, the method includes collecting profiling data (step 300). For example, the profiler 202 shown in FIG. 2 may observe and record, or receive, one or more measures of performance of a MapReduce job. The profiler 202 may observe and record the actual run-time behavior of one or more MapReduce jobs executing on a MapReduce system. These observations may be represented in the form of job profiles.

The method of FIG. 3 includes invoking a desired recommender (step 302). For example, the what-if engine 206 shown in FIG. 2 may analyze and learn from the job profiles. Further, the what-if engine 206 may predict the impact of hypothetical tuning choices. The what-if engine 206 may give predictions to users in answer to their questions or to recommenders 204 that are searching for good settings for tuning controls. The what-if engine 304 may be called zero or more times (step 304).

The method of FIG. 3 includes applying recommendations manually or by using auto tuning (step 308). For example, recommenders 204 may choose appropriate settings for various tuning knobs in order to improve MapReduce performance along one or more dimensions (e.g., to lower completion time, improve resource utilization, lower pay-as-you-go monetary costs on cloud platforms, and the like). The recommendations may either be applied manually or using support for automatic tuning in accordance with embodiments of the present disclosure.

The profiler 202 can be responsible for collecting job profiles. A job profile may include the dataflow and cost estimates for a MapReduce job $j=<p, d, r, c>$. Dataflow estimates may represent information regarding the number of bytes and key-value pairs processed during j's execution. Cost estimates may represent resource usage and execution time.

The visualizer 208 can function to help users understand the operation of a MapReduce system. Further, the visualizer 208 can assist users with diagnosing and tuning (or controlling) the MapReduce system. These and other features of a visualizer are described in more detail herein.

Figure 4:
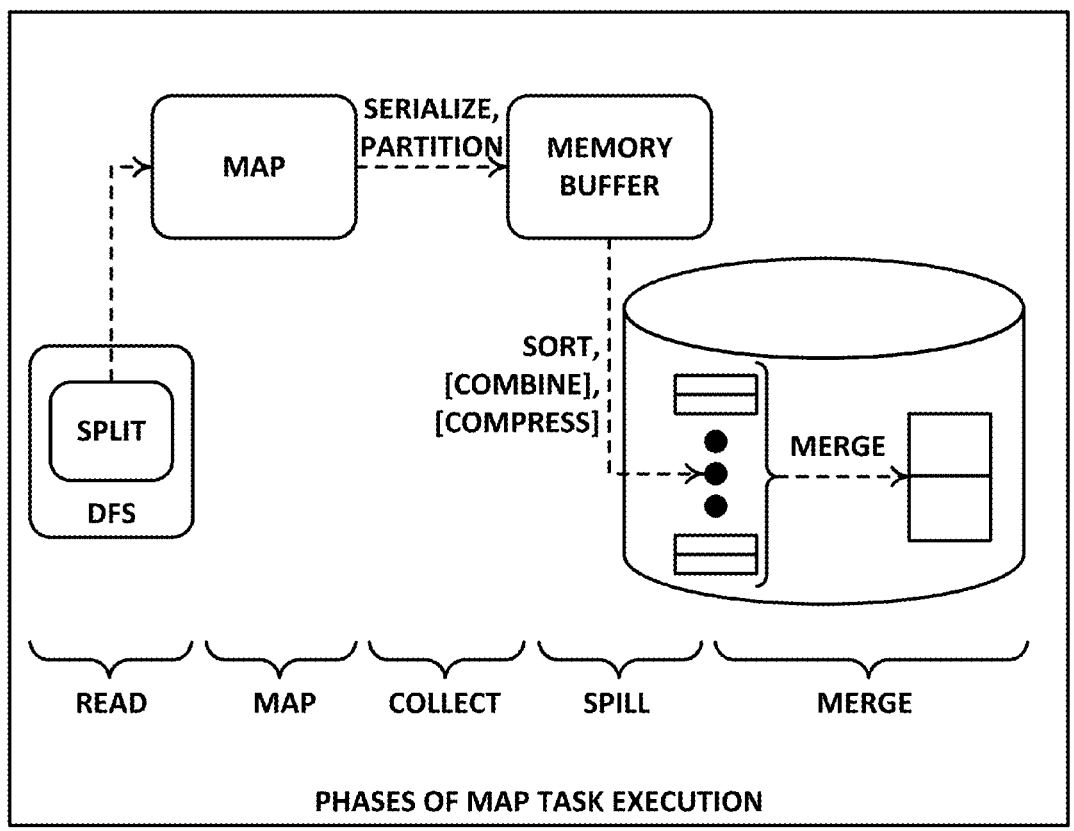
FIG. 4 is a diagram showing phases of execution of a map task in a MapReduce job executing on a distributed data processing system.

FIG. 4 illustrates a diagram depicting execution of a map task showing the map-side phases. Referring to FIG. 4, the map task execution may be divided into five phases: read, map, collect, spill and merge. The read phase includes reading the input split and creating the input key-value pairs (records). The map phase includes executing the user-defined map function to generate the map-output data. The collect phase includes partitioning and collecting the intermediate (map-output) data into a buffer before spilling. The spill phase includes sorting, using the combine function if any, performing compression if specified, and finally writing to local disk to create file spills. The merge phase includes merging file spills into a single map output file. Merging may be performed in multiple rounds.

Figure 5:
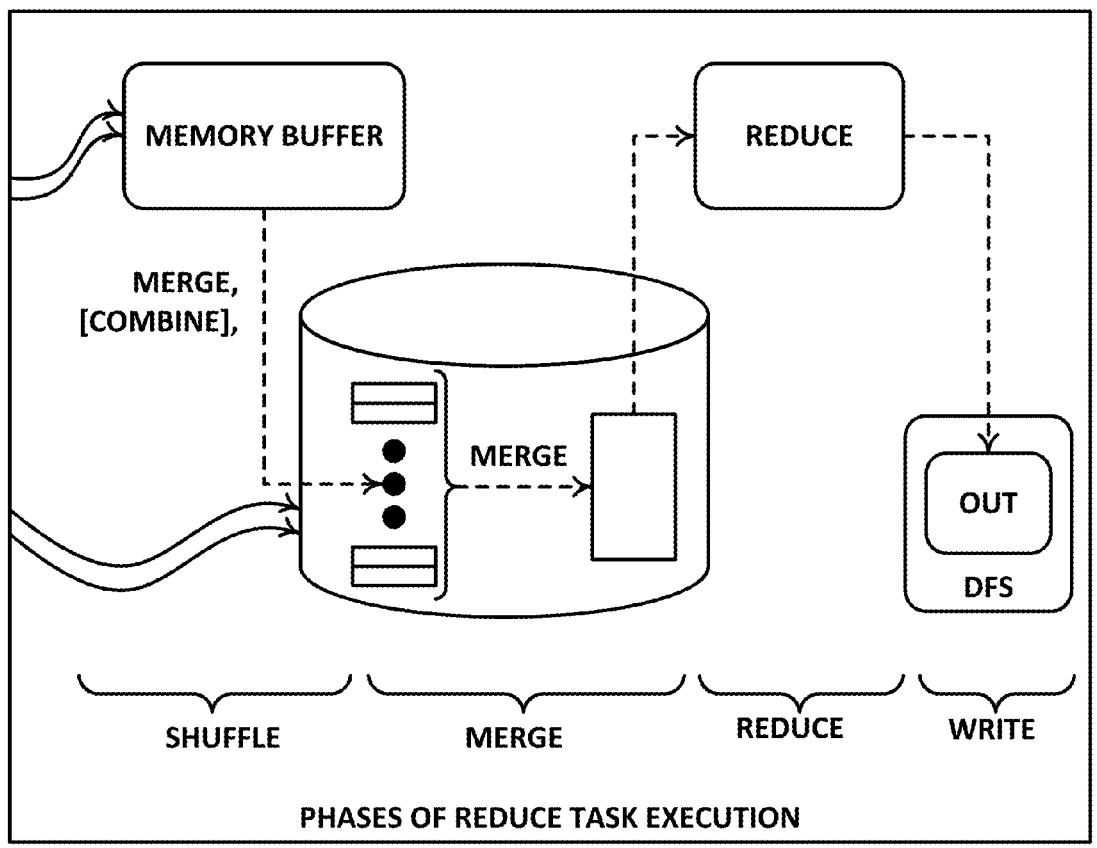
FIG. 5 is a diagram showing phases of execution of a reduce task in a MapReduce job executing on a distributed data processing system.

FIG. 5 illustrates a diagram depicting execution of a reduce task showing the reduce-side phases. Referring to FIG. 5, a reduce task may be divided into four phases: shuffle, merge, reduce, and write. The shuffle phase may include transferring the intermediate data from the mapper nodes to a reducer's node and decompressing if needed. Partial merging may also occur during this phase. The merge phase may include merging the sorted fragments from the different mappers to form the input to the reduce function. The reduce phase may include executing the user-defined reduce function to produce the final output data. The write phase may include compressing, if specified, and writing the final output to a distributed file system.

Task phases are modeled for accurately modeling the execution of a MapReduce job. The execution of an arbitrary MapReduce job is represented using a job profile. A job profile may be referred to as a concise statistical summary of MapReduce job execution. A job profile may include dataflow and cost estimates for a MapReduce job j. Dataflow estimates may represent, for example, information regarding the number of bytes and key-value pairs processed during MapReduce job j's execution. Cost estimates may represent, for example, resource usage and execution time.

Performance models can calculate the dataflow and cost fields in a job profile of a MapReduce job. For example, dataflow fields can capture information about the amount of data, both in terms of bytes as well as records (e.g., key-value pairs), flowing through the different tasks and phases of a MapReduce job execution. Table 1 below lists example dataflow fields. Cost fields may capture information about execution time or resource usage at the level of tasks and phases within the tasks for a MapReduce job execution. Table 2 below lists example cost fields.

TABLE 1

Dataflow fields in the job profile; d, r, and c denote respectively input data properties, cluster resource properties, and configuration parameters settings.

| Abbreviation | Profile Field (All fields, unless otherwise stated, represent information at the level of tasks) | Depends On | | |
|---|---|---|---|---|
| | | d | r | c |
| dNumMappers | | X | | X |
| dNumReducers | | | | |
| dMapInRecs | | X | | X |
| dMapInBytes | | X | | X |
| dMapOutRecs | | X | | X |
| dMapOutBytes | | | | |
| dNumSpills | | X | | X |
| dSpillBufferRecs | | X | | X |
| dSpillBufferSize | | X | | X |
| dSpillFileRecs | | X | | X |
| dSpillFileSize | | X | | X |
| dNumRecsSpilled | | X | | X |
| dNumMergePasses | | X | | X |
| dShuffleSize | | X | | X |
| dReduceInGroups | | | | |
| dReduceInRecs | | X | | X |
| dReduceInBytes | | X | | X |
| dReduceOutRecs | | X | | X |
| dReduceOutBytes | | X | | X |
| dCombineInRecs | | X | | X |
| dReduceOutRecs | | X | | X |
| dLocalBytesRead | | X | | X |
| dLocalBytesWritten | | X | | X |
| dHdfsBytesRead | | X | | X |
| dHdfsBytesWritten | | X | | X |

TABLE 2

| Abbreviation | Profile Field (All fields, unless otherwise stated, represent information at the level of tasks) | Depends On | | |
|---|---|---|---|---|
| | | d | r | c |
| cSetupPhaseTime | Setup phase time in a task | X | X | X |
| cCleanupPhaseTime | Cleanup phase time in a task | X | X | X |
| cReadPhaseTime | Read phase time in the map task | X | X | X |
| cMapPhaseTime | Map phase time in the map task | X | X | X |
| cCollectPhaseTime | Collect phase time in the map task | X | X | X |
| cSpillPhaseTime | Spill phase time in the map task | X | X | X |
| cMergePhaseTime | Merge phase time in map/reduce task | X | X | X |

TABLE 2-continued

| Abbreviation | Profile Field (All fields, unless otherwise stated, represent information at the level of tasks) | Depends On | | |
|---|---|---|---|---|
| | | d | r | c |
| cShufflePhaseTime | Shuffle phase time in the reduce task | X | X | X |
| cReducePhaseTime | Reduce phase time in the reduce task | X | X | X |
| cWritePhaseTime | Write phase time in the reduce task | X | X | X |

Inputs for the models may include estimated dataflow statistics fields, estimated cost statistics fields, as well as cluster-wide and job-level configuration parameter settings. Dataflow statistics fields may capture statistical information about the dataflow that is expected to remain unchanged across different executions of the MapReduce job unless the data distribution in the input dataset changes significantly across these executions. Table 3 lists example dataflow statistics fields.

Cost statistics fields can capture statistical information about execution time for a MapReduce job that is expected to remain unchanged across different executions of the job unless the cluster resources (e.g., CPI, I/O, and the like) available per machine change. Table 4 lists example cost statistics fields.

Job profiles may be generated in two distinct ways. In one way, a profiler may generate profiles by collecting monitoring data during full or partial job execution. In another way, a what-if engine may generate new profiles from existing ones using estimation techniques based on modeling and simulation of MapReduce job execution.

Figure 6:
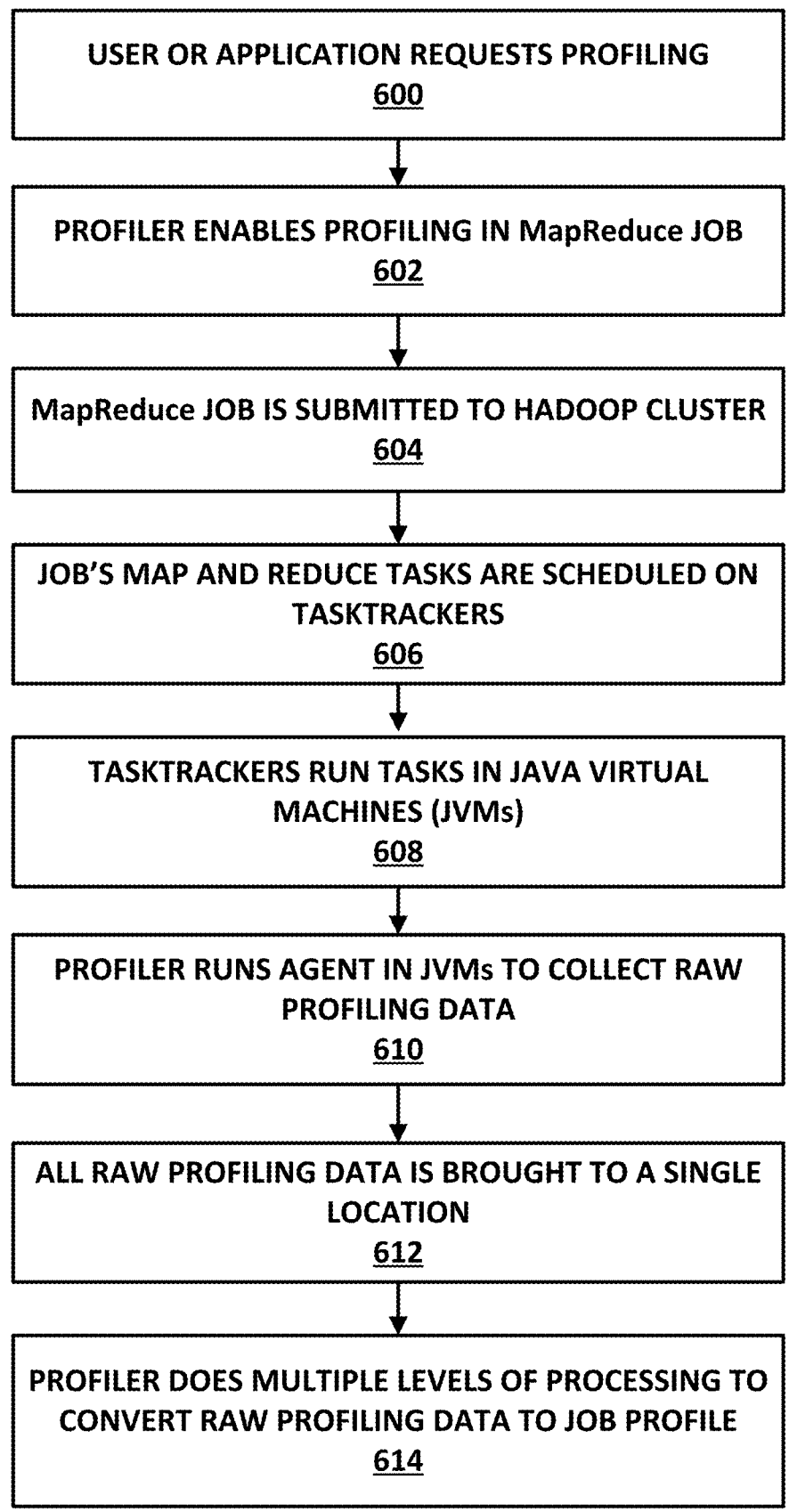
FIG. 6 is a flowchart of an example method for collecting profiling information and for processing this information to generate a profile.

FIG. 6 is a flowchart of an example method that may be implemented by the profiler to generate a profile in accordance with embodiments of the present disclosure. A user or application may request a job profile to be generated for a MapReduce job j (step 600). The profiler may then enable profiling for j (step 602). The job j is submitted to a distributed data processing system such as HADOOP® for execution (step 604). Job j's map and reduce tasks get scheduled for execution at worker machines (called TaskTrackers in HADOOP®) in the distributed data processing system (step 606). The worker machines execute the map and reduce tasks. For example, TaskTrackers in HADOOP® run the tasks in virtual machines (step 608). As the tasks execute, the profiler may collect monitoring data as described herein (step 610). The monitoring data may be brought to a single location such as a machine or a distributed file-system (step 612). The profiler may process the monitoring data to create a profile for the job j (step 614).

In accordance with embodiments, monitoring may be implemented through dynamic instrumentation. When a user-specified MapReduce program p is run, the MapReduce framework is responsible for invoking the map, reduce, and other functions in p. This property may be used by the profiler to collect run-time monitoring data from unmodified programs running on the MapReduce framework. The profiler applies dynamic instrumentation to the MapReduce framework—not to the MapReduce program p—by specifying a set of event-condition-action (ECA) rules.

The space of possible events in the ECA rules corresponds to events arising during program execution including entry or exit from functions, memory allocation, system calls to the operating system, and the like. If the condition associated with the event holds when the event fires, then the associated action is invoked. An action can involve, for example, getting the duration of a function call, examining the memory state, or counting the number of bytes transferred.

A dynamic instrumentation tool may be used by the profiler for a MapReduce framework. For example, the tool may be used by the profiler for a HADOOP® MapReduce framework written in Java. To collect monitoring data for a program being run by HADOOP®, the profiler uses ECA rules to dynamically instrument the execution of selected Java classes with HADOOP®. This process may intercept the corresponding Java class bytecodes as they are executed, and injects additional bytecodes to run the associated actions in the ECA rules.

Apart from Java, HADOOP® can run a MapReduce program p written in various programming languages such as, but not limited to, Python, R, or Ruby using Streaming or C++ using Pipes. HADOOP® executes Streaming and Pipes programs through special map and reduce tasks that each communicate with an external process to run the user-specified map and reduce functions. The MapReduce framework's role remains the same irrespective of the language in which p is specified. Thus, the profiler can generate a profile for p by (only) instrumenting the framework; no changes to p are required.

The raw monitoring data collected through dynamic instrumentation of job execution at the task and phase levels includes record and byte counters, timings, and resource usage information. For example, during each spill, the exit point of the sort function is instrumented to collect the sort duration as well as the number of bytes and records sorted. A series of post-processing steps involving aggregation and extraction of statistical properties may be applied to the raw data in order to generate the various fields in the job profile.

The raw monitoring data collected from each task may first be processed to generate the fields in a task profile. For example, the raw sort timings can be added as part of the overall spill time, whereas the combiner selectivity from each spill is averaged to get the task's combiner selectivity. The task profiles may further be processed to give a concise job profile including representative map and reduce task profiles. The job profile contains one representative map task profile for each logical input. For example, Word Co-occurrence accepts a single logical input (be it a single file, a directory, or a set of files), while a two-way Join accepts two logical inputs. The job profile contains a single representative reduce task profile.

In accordance with embodiments, dynamic instrumentation may be turned on or off seamlessly at run-time, incurring zero overhead when turned off. Two example techniques are disclosed herein that use task-level sampling in order to generate approximate job profiles while keeping the run-time overhead low: (1) if the intent is to profile a job j during a regular run of j on the production cluster, then the profiler can collect task profiles for only a sample of j's tasks; and (2) if the intent is to collect a job profile for j as quickly as possible, then the profiler can selectively execute (and profile) only a sample of j's tasks.

In an example, a job with 100 map tasks may be considered. With the first approach and a sampling percentage of 10%, all 100 tasks can be run, but only 10 of them will have dynamic instrumentation turned on. In contrast, the second approach can run only 10 of the 100 tasks.

Figure 7:
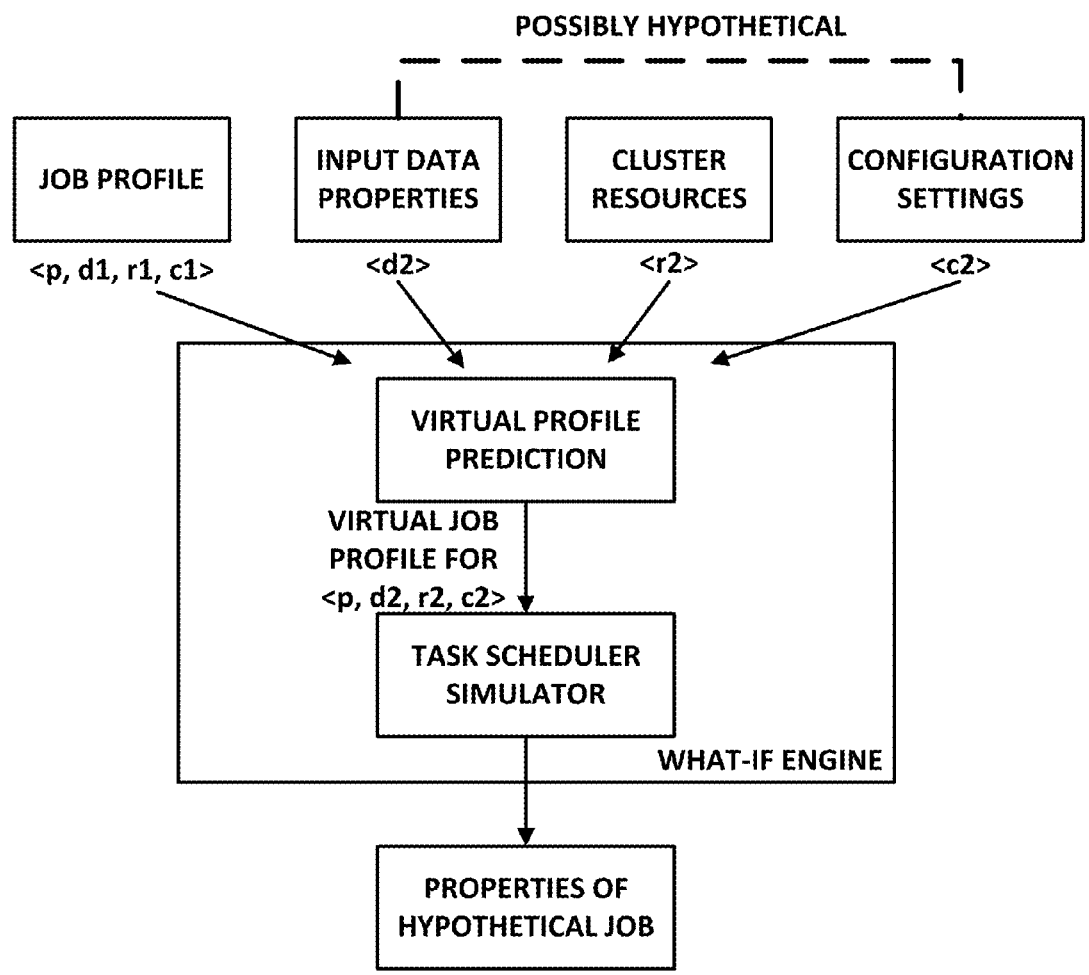
FIG. 7 is a flowchart showing an example method for answering a what-if question by a what-if engine.

A what-if question may have the following form: Given at least one profile of a job j1=<p, r1, r1, r1> that runs a MapReduce program p over input data r1 and cluster resources r1 using configuration r1, what will the performance of program p be if p is run over input data d2 and cluster resources r2 using configuration c2? That is, how will job j2=<p, d2, r2, c2> perform? FIG. 7 shows a what-if engine's overall procedure for answering such a what-if question that requires predicting the performance of the MapReduce job j2=<p, d2, r2, c2>. This procedure may include the following example steps. A virtual job profile is predicted for the new hypothetical job j2. The virtual profile is then used to simulate the execution of j2 on the (perhaps hypothetical) cluster r2. The simulated execution can be used to predict the overall performance and output data properties of j2. Predictions for multiple jobs can be combined together to predict the overall performance of a MapReduce workload.

Figure 8:
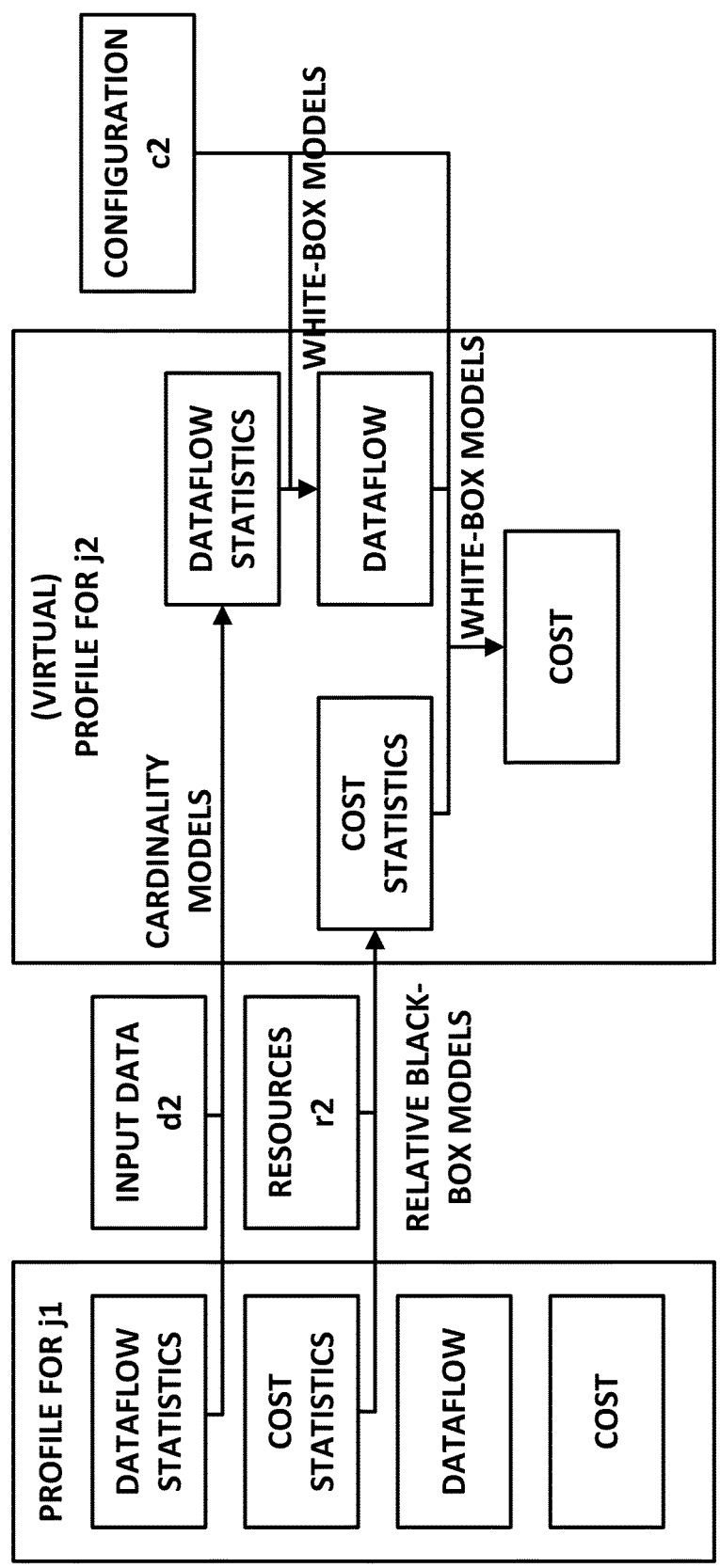
FIG. 8 is a flowchart showing an example method for predicting a virtual job profile by a what-if engine.

Virtual profile estimation can be based on combining black-box models, white-box models, and simulation. The overall prediction process has been broken down into smaller steps as shown in FIG. 8, and a suitable modeling technique was picked for each step. These smaller steps correspond to the different categories of fields in a job profile.

Database query optimizers can use data-level statistics such as, for example, histograms to estimate the cost of execution plans for declarative queries. MapReduce systems lack the declarative query semantics and structured data representations of database systems. Thus, the common case in the what-if engine is to not have detailed statistical information about the input data d2 for the hypothetical job j2. By default, the what-if engine can use a dataflow proportionality assumption which says that the logical dataflow sizes through the job's phases are proportional to the input data size. It follows from this assumption that the dataflow statistics fields in the virtual profile of j2 can be the same as those in the profile of job j1 given as input.

When additional information is available, the what-if engine can allow the default assumption to be overridden by providing dataflow statistics fields in the virtual profile directly as input. For example, when higher layers like Hive or Pig submit a MapReduce job like a join for processing, they can input dataflow statistics fields in the profile based on statistics available at the higher layer.

Clusters with identical resources can have the same CPU and I/O (local and remote) costs. Thus, if the cluster resource properties of r1 are the same as those of r2, then the cost statistics fields in the hypothetical job j2's virtual profile can be copied directly from the profile of job j1 given as input. This copying cannot be used when r1 is not equal to r2, in particular, when job j2 runs on a target cluster containing machines with a different type from the source cluster where job j1 was run. The technique that can be used when r1 is not equal to r2 is based on a relative black-box model M that can predict the cost statistics fields in the virtual profile for the target cluster from the cost statistics fields in the job profile for the source cluster.

Training samples have to be generated for the M model. r1 and r2 denote the cluster resources respectively for the source and target clusters. Suppose the MapReduce program p is run on input data d and configuration parameter settings c on both the source and target clusters. That is, we run the two jobs jsrc=<p, d, r1, c> and jtgt=<p, d, r2, c>. From these runs, the profiles for these two jobs can be generated by the profiler using the monitoring method described earlier. Even further, a separate task profile can be generated for each task executed in each of these two jobs. Therefore, from the $i^{th}$ task in these two jobs, a training sample for the M model can be obtained.

The above training samples can be generated by running a related pair of jobs jsrc and jtgt that have the same MapReduce program p, input data d, and configuration parameter settings c. A complete set of training samples can be generated by using a training benchmark containing jobs with different <p, d, c> combinations. Selecting an appropriate training benchmark is nontrivial because the two main requirements of effective black-box modeling have to be satisfied. First, for accurate prediction, the training samples should have good coverage of the prediction space. Second, for efficiency, the time to generate the complete set of training samples should be small.

Based on the coverage and efficiency considerations, three example methods are disclosed herein for selecting the training benchmark: apriori, fixed, and custom. Apriori assumes that the full workload of jobs that will run on the clusters is known at model training time. A sample of jobs is selected from this workload, either randomly or from the top-k longest-running jobs. To improve the training efficiency, it may be possible to run the jobs on a scaled-down sample of their input data. Apriori provides good coverage of the prediction space as long as the assumption on the workload holds. However, Apriori's running time grows with the size of the workload and the input data.

Fixed assumes that a good coverage of the prediction space can be obtained by selecting a predetermined set of existing MapReduce jobs and executing them using different configuration settings that can provide different degrees of resource usage. For example, the benchmark can include CPU-intensive, CPU-light, I/O-intensive, and I/O-light jobs. The running time of Fixed is independent of the size of the actual workload and the input data.

Custom can execute a small, synthetic workload to generate training samples for cost statistics efficiently such that these samples will give good coverage of the prediction space. It is because of the abstraction of any MapReduce job execution as a job profile—where a profile can be represented as a point in a high-dimensional space—that such a unique approach is enabled that is independent of the actual MapReduce workload run on the cluster.

The custom training benchmark can include two synthetic MapReduce job templates: a data-generation template and a data-processing template. These two templates are instantiated in different ways to create multiple MapReduce job executions. Unlike the fixed benchmark that consists of existing MapReduce jobs, the jobs generated by custom may be generated such that the different tasks within these jobs behave differently in terms of their CPU, I/O, memory, and network usage. Custom produces more diverse training samples per job execution than apriori or fixed. Custom provides the additional advantages of lower and more predictable running time for the training benchmark, and no knowledge or use of actual workloads and input data is needed during the training phase. The training benchmark has to be run only once (or with a few repetitions) per target cluster resource; giving only a linear number of benchmark runs, and not quadratic as may be expected from the relative nature of the M model. The training samples for each source-to-target cluster pair are available from these runs.

Once the training samples are generated, there are many supervised learning techniques available for generating the black-box model M. Since cost statistics are real-valued, the M5 tree model may be used, for example. An M5 tree model may first build a regression-tree using a typical decision-tree induction algorithm. Then, the tree goes through pruning and smoothing phases to generate a linear regression model for each leaf of the tree.

Once the black-box model M is trained, the cost statistics fields in the job profile for the source cluster r1 can be input to M in order to predict the cost statistics fields in the virtual profile for the target cluster r2 when r1 is not equal to r2.

The what-if engine may use a detailed set of analytical (white-box) models to calculate the dataflow fields in the virtual profile given (i) the dataflow statistics fields predicted as described earlier, and (ii) the configuration parameter settings c2 in the hypothetical job j2. These models give good accuracy by capturing the subtleties of MapReduce job execution at the fine granularity of phases within map and reduce tasks. A second set of analytical models combines the estimated cost statistics and dataflow fields in order to estimate the cost fields in the virtual profile.

Regarding configuration parameters, in HADOOP®, a set of cluster-wide and job-level configuration parameter settings can determine how a given MapReduce job executes on a given cluster. Table 5 below lists relevant example configuration parameters.

The performance models provide good accuracy by capturing the subtleties of MapReduce job execution at the fine granularity of phases within map and reduce tasks. The current models can be applied to HADOOP®, but the overall approach may apply to any suitable MapReduce implementation or system.

To simplify the notation, abbreviations are used in Tables 1-5. It is noted that the prefixes in all abbreviations are used to distinguish where each abbreviation belongs to: d for dataset fields, c for cost fields, ds for data statistics fields, cs for cost statistics fields, p for HADOOP® parameters, and t for temporary information not stored in the profile.

The following definitions and initializations are provided:

$$\text{Identity Function } I(x) = \begin{cases} 1, & \text{if } x \text{ exists or equals true} \\ 0, & \text{otherwise} \end{cases}$$

If ($pUseCombine$ == FALSE)

$dsCombineSizeSel = 1$ $dsCombineRecsSel = 1$ $csCombineCPUCost = 0$

If ($pIsInCompressed$ == FALSE)

$dsInputCompressRatio = 1$ $csInUncomprCPUCost = 0$

If ($pIsIntermCompressed$ == FALSE)

$dsIntermCompressRatio = 1$ $csIntermUncomCPUCost = 0$ $csIntermComCPUCost = 0$

If ($pIsOutCompressed$ == 0)

$dsOutCompressRatio = 1$ $csOutComprCPUCost = 0$

TABLE 3

Dataflow statistics fields in the job profile; d, r, and c denote respectively input data properties, cluster resource properties, and configuration parameter settings.

| Abbreviation | Profile Field (All fields, unless otherwise stated, represent information at the level of tasks) | d | r | c |
|---|---|---|---|---|
| dsInputPairWidth | Width of input key-value pairs | X | | |
| dsRecsPerRedGroup | Number of records per reducer's group | X | | |
| dsMapSizeSel | Map selectivity in terms of size | X | | |
| dsMapRecsSel | Map selectivity in terms of records | X | | |
| dsReduceSizeSel | Reduce selectivity in terms of size | X | | |
| dsReduceRecsSel | Reduce selectivity in terms of records | X | | |
| dsCombineSizeSel | Combine selectivity in terms of size | X | | X |
| dsCombineRecsSel | Combine selectivity in terms of records | X | | X |
| dsInputCompressRatio | Input data compression ratio | X | | |
| dsIntermCompressRatio | Map output compression ratio | X | | X |
| dsOutCompressRatio | Output compression ratio | X | | X |
| dsStartupMem | Startup memory per task | X | | |
| dsSetupMem | Setup memory per task | X | | |
| dsCleanupMem | Cleanup memory per task | X | | |
| dsMemPerMapRec | Memory per map's record | X | | |
| dsMemPerRedRec | Memory per reduce's record | X | | |

TABLE 4

Cost statistics fields in the job profile; d, r, and c denote respectively input data properties, cluster resource properties, and configuration parameter settings.

| Abbreviation | Profile Field (All fields, unless otherwise stated, represent information at the level of tasks) | d | r | c |
|---|---|---|---|---|
| csHdfsReadCost | I/O cost for reading from HDFS per byte | | X | |
| csHdfsWriteCost | I/O cost for writing to HDFS per byte | | X | |
| csLocalIOReadCost | I/O cost for reading from local disk per byte | | X | |
| csLocalIOWriteCost | I/O cost for writing to local disk per byte | | X | |
| csNetworkCost | Cost for network transfer per byte | | X | |
| csMapCPUCost | CPU cost for executing the Mapper per record | | X | |
| csReduceCPUCost | CPU cost for executing the Reducer per record | | X | |
| csCombineCPUCost | CPU cost for executing the Combiner per record | | X | |
| csPartitionCPUCost | CPU cost for partitioning per record | | X | |
| csSerdeCPUCost | CPU cost for serializing/deserializing per record | | X | |
| csSortCPUCost | CPU cost for sorting per record | | X | |
| csMergeCPUCost | CPU cost for merging per record | | X | |
| csInUncomprCPUcost | CPU cost for uncompr/ing the input per byte | | X | |
| csIntermUncomCPUCost | CPU cost for uncompr/ing map output per byte | | X | X |
| csIntermComCPUCost | CPU cost for compressing map output per byte | | X | X |
| csOutComprCPUCost | CPU cost for compressing the output per byte | | X | X |
| csSetupCPUCost | CPU cost of setting up a task | | X | |
| csCleanupCPUCost | CPU cost of cleaning up a task | | X | |

In accordance with embodiments, the read and map phases in the map task may be modeled. During this phase, the input split may be read (and uncompressed if needed) and the key-value pairs may be created and passed as input to the user-defined map function.

$$dMapInBytes = \frac{pSplitSize}{dsInputCompressRatio}$$

$$dMapInRecs = \frac{dMapInBytes}{dsInputPairWidth}$$

The cost of the Map Read can be:

$c$ReadPhaseTime=$p$SplitSize×$cs$HdfsReadCost+
    $p$SplitSize×$cs$InUncomprCPUCost The cost of the Map phase may be:

$c$MapPhaseTime=$d$MapInRecs×$cs$MapCPUCost

If the MapReduce job includes only mappers (i.e., pNumReducers=0), then the spilling and merging phases may not be executed and the map output may be written directly to HDFS.

$d$MapOutBytes=$d$MapInBytes×$ds$MapSizeSel $d$MapOutRecs=$d$MapInRecs×$ds$MapRecsSel The cost of the Map Write phase may be:

$dWritePhaseTime = dMapOutBytes \times csOutComprCPUCost +$
$dMapOutBytes \times dsOutCompress\ Ratio \times csHdfsWriteCost$ The map function generates output key-value pairs (records) that are placed in the map-side memory buffer of size pSortMB. The amount of data output by the map function is calculated as follows:

$$dMapOutBytes = dMapInBytes \times dsMapSizeSel$$

$$dMapOutRecs = dMapInRecs \times dsMapRecsSel$$

$$tMapOutRecWidth = \frac{dMapOutBytes}{dMapOutRecs}$$

The map-side buffer includes two disjoint parts: the "serialization" part that stores the serialized map-output records, and the "accounting" part that stores 16 bytes of metadata per record. When either of these two parts fills up to the threshold determined by the pSpillPerc, the spill process can begin. The maximum number of records in the serialization buffer before a spill is triggered is:

TABLE 5

A subset of cluster-wide and job-level HADOOP ® parameters

| Abbreviation | HADOOP ® Parameter | Default Value |
| --- | --- | --- |
| pNumNodes | Number of Nodes | |
| pTaskMem | mapred.child.java.opts | −X m × 200 m |
| pMaxMapsPerNode | mapred.tasktracker.map.tasks.max | 2 |
| pMaxRedsPerNode | mapred.tasktracker.reduce.tasks.max | 2 |
| pNumMappers | mapred.map.tasks | |
| pSortMB | io.sort.mb | 100 MB |
| pSpillPerc | io.sort.spill.percent | 0.8 |
| pSortRecPerc | io.sort.record.percent | 0.05 |
| pSortFactor | io.sort.factor | 10 |
| pNumSpillsForComb | min.num.spills.for.combine | 3 |
| pNumReducers | mapred.reduce.tasks | |
| pReduceSlowstart | mapred.reduce.slowstart.completed.maps | 0.05 |
| pInMemMergeThr | mapred.inmem.merge.threshold | 1000 |
| pShuffleInBufPerc | mapred.job.shuffle.input.buffer.percent | 0.7 |
| pShuffleMergePerc | mapred.job.shuffle.merge.percent | 0.66 |
| pReducerInBufPerc | mapred.job.reduce.input.buffer.percent | 0 |
| pUseCombine | mapred.combine.class or mapreduce.combine.class | null |
| pIsIntermCompressed | mapred.compress.map.output | false |
| pIsOutCompressed | mapred.output.compress | false |
| pIsInCompressed | Whether the input is compressed or not | |
| pSplitSize | The size of the input split | |

$$tMaxSerRecs = \left\lfloor \frac{pSortMB \times 2^{20} \times (1 - pSortRecPerc) \times pSpillPerc}{tMapOutRecWidth} \right\rfloor$$

The maximum number of records in the accounting buffer before a spill is triggered is:

$$tMaxAccRecs = \left\lfloor \frac{pSortMB \times 2^{20} \times pSortRecPerc \times pSpillPerc}{16} \right\rfloor$$

Hence, the number of records in the buffer before a spill is:

$d$SpillBufferRecs=Min{$t$MaxSerRecs,$t$MaxAccPerc, $d$MapOutRecs}

The size of the buffer included in a spill is:

$d$SpillBufferSize=$d$SpillBufferRecs×$t$MapsOutRecWidth

The overall number of spills is:

$$dNumSpills = \left\lceil \frac{dMapOutRecs}{dSpillBufferRecs} \right\rceil$$

The number of pairs and size of each spill file (i.e., the amount of data that may be written to disk) depend on the width of each record, the possible use of the Combiner, and the possible use of compression. The Combiner's pair and size selectivities as well as the compression ratio are part of the Dataflow Statistics fields of the job profile. If a Combiner is not used, then the corresponding selectivities are set to 1 by default. If map output compression is disabled, then the compression ratio is set to 1.

Hence, the number of records and size of a spill file are:

$d$SpillFileRecs=$d$SpillBufferRecs×$ds$CombineRecsSel $d$SpillFileSize=$d$SpillBufferSize×$ds$CombineSizeSel× $ds$IntermCompressRatio The total cost of the Map's Collect and Spill phases are:

$$cCollectPhaseTime = dMapOutRecs \times csPartitionCPUCost +$$
$$dMapOutRecs \times csSerdeCPUCost$$

$$cSpillPhaseTime = dNumSpills \times$$
$$\left[ dSpillBufferRecs \times \log_2\left(\frac{dSpillBufferRecs}{pNumReducers}\right) \times csSortCPUCost + \right.$$
$$dSpillBufferRecs \times csCombineCPUCost +$$
$$dSpillBufferSize \times dsCombineSizeSel \times cs\ IntermComCPUCost +$$
$$\left. dSpillFileSize \times csLocalIOWriteCost \right]$$

In accordance with embodiments, Merge phase in the map task may be modeled. The goal of the Merge phase is to merge all the spill files into a single output file, which is written to local disk. In an example, the Merge phase can occur only if more than one spill file is created. Multiple merge passes may occur, depending on the pSortFactor parameter. pSortFactor defines the maximum number of spill files that can be merged together to form a new single file. A merge pass may be defined as the merging of at most pSortFactor spill files. A merge round may be defined to be one or more merge passes that merge only spills produced by the spill phase or a previous merge round. For example, suppose dNumSpills=28 and pSortFactor=10. Then, 2 merge passes may be performed (merging 10 files each) to create 2 new files. This constitutes the first merge round. Then, the 2 new files can be merged together with the 8 original spill files to create the final output file, forming the second and final merge round.

The first merge pass may be unique because HADOOP® can calculate the optimal number of spill files to merge so that all other merge passes can merge exactly pSortFactor files. Notice how, in the example above, the final merge round merged exactly 10 files.

The final merge pass is also unique in the sense that if the number of spills to be merged is greater than or equal to pNumSpillsForComb, the combiner can be used again. Hence, the intermediate merge rounds and the final merge rounds may be treated separately. For the intermediate merge passes, it is calculated how many times (on average) a single spill is to be read.

Note that in the following it is assumed that numSpils≤pSortFactor$^2$. In the opposite case, a simulation-based approach may be used in order to calculate the number of spill files merged during the intermediate merge rounds as well as the total number of merge passes. Since the Reduce task also contains a similar Merge phase, the following three methods may be defined to reuse later:

$$calcNumSpillsFirstPass\,(N,F) = \begin{cases} N, & \text{if } N \le F \\ F, & \text{if } (N-1)\text{MOD}(F-1) = 0 \\ (N-1)\text{MOD}(F-1)+1, & \text{otherwise} \end{cases}$$

$$calcNumSpillsIntermMerge(N,F) = \begin{cases} N, & \text{if } N \le F \\ 1 + \left\lfloor \dfrac{N-P}{F} \right\rfloor * F, & \text{if } N \le F^2, \end{cases}$$

where $P = calcNumSpillsFirstPass\,(N,F)$, where $S = calcNumSpillsIntermMerge\,(N,F)$ The number of spills read during the first merge pass is:

$t$NumSpillsFirstPass=calcNumSpillsFirstPass($d$Num-Spills,$p$SortFactor)

The number of spills read during intermediate merging is:

$t$NumSpillsIntermMerge=calcNumSpillsIntermMerge ($d$NumSpills,$p$SortFactor)

The total number of merge passes is:

$$dNumMergePasses = \begin{cases} 0, & \text{if } dNumSpills = 1 \\ 1, & \text{if } dNumSpills \le pSortFactor \\ 2 + \left\lfloor \dfrac{dNumSpills - tNumSpillsFirstPass}{pSortFactor} \right\rfloor, & \text{if } dNumSpills \le pSortFactor^2 \end{cases}$$

The number of spill files for the final merge round is:

$t$NumSpillsFinalMerge=calcNumSpillsFinalMerge ($d$NumSpills,$p$SortFactor)

As discussed earlier, the Combiner may be used during the final merge round. In this case, the size and record Combiner selectivities are:

$tUseDCombInMerge = (dNumSpills > 1) \text{ AND } (pUseCombine)$
$\text{AND } (tNumSpillsFinalMerge \ge pNumSpillsForComb)$ $$tMergeCombSizSel = \begin{cases} dsCombienSizeSel, & \text{if } tUseCombInMerge \\ 1, & \text{otherwise} \end{cases}$$

$$tMergeCombRecsSel = \begin{cases} dsCombineRecsSel, & \text{if } tUseCombInMerge \\ 1, & \text{otherwise} \end{cases}$$

The total number of records spilled equals the sum of (i) the records spilled during the Spill phase, (ii) the number of records that participated in the intermediate merge round, and (iii) the number of records spilled during the final merge round.

$dNumRecsSpilled =$ $dSpillFileRecs \times dNumSpills + dSpillFileRecs \times tNumSpillsIntermMerge +$ $dSpillFileRecs \times dNumSpills \times tMergeCombRecsSel$ The final size and number of records for the final map output data are:

$tIntermMergeTime =$ $tNumSpillsIntermMerge \times [dSpillFileSize \times csLocalIOReadCost +$ $dSpillFile\,Size \times csIntermUncomCPUCost +$ $dSpillFileRecs \times csMergeCPUCost + \dfrac{dSpillFileRecs}{dsIntermCompressRatio} \times$ $csIntermComCPUCost + dSpillFileSize \times csLocalIOWriteCost$ $tFinalMergeTime = dNumSpills \times [dSpillFileSize \times csLocalIOReadCost +$ $dSpillFileSize \times csIntermUncomCPUCost +$ $dSpillFileRecs \times csCombineCPUCost] +$ $\dfrac{tIntermDataSize}{dsIntermCompressRatio} \times csIntermComCPUCost +$ $tIntermDataSize \times csLocalIOWriteCost$ $cMergePhaseTime = tIntermMergeTime + tFinalMergeTime$ In the Shuffle phase, the framework fetches the relevant map output partition from each mapper (called a map segment) and copies it to the reducer's node. If the map output is compressed, HADOOP® can uncompress it to the reducer's node. If the map output is compressed, HADOOP® can uncompress it after the transfer as part of the shuffling process. For a uniform distribution of the map output to all reducers, the size and number of records for each map segment that reaches the reduce side may be:

$tSegmentComprSize = \dfrac{tIntermDataSize}{pNumReducers}$ $tSegmentUncomprSize = \dfrac{tSegmentComprSize}{dsIntermCompressRatio}$ $tSegmentRecs = \dfrac{tIntermDataRecs}{pNumReducers}$ where tIntermDataSize and tIntermDataRecs are the size and number of records produced as intermediate output by a single mapper. A more complex model can be used to account for the presence of skew. The data fetched to a single reducer can be:

$dShuffleSize = pNumMappers * tSegmentComprSize$ $dShuffleRecs = pNumMappers * tSegmentRecs$ The intermediate data can be transferred and placed in an in-memory shuffle buffer with a size proportional to the parameter pShuffleInBufPerc:

$t$ShuffleBufferSize=$p$ShuffleInBufPerc×$p$TaskMem

However, when the segment size is greater than 25% times the tShuffleBufferSize, the segment can get copied directly to local disk instead of the in-memory shuffle buffer. Two cases were considered as follows.

In case 1, the following equation can apply tSegmentUncomprSize<0.25×tShuffleBufferSize. The map segments are transferred, uncompressed if needed, and placed into the shuffle buffer. When either (a) the amount of data placed in the shuffle buffer reaches a threshold size determined by the pShuffleMergePerc parameter or (b) the number of segments becomes greater than the pInMemMergeThr parameter, the segments are merged and spilled to disk creating a new local file (referred to as "shuffle file"). The size threshold to begin merging is:

$t$MergeSizeThr=$p$ShuffleMergePerc×$t$ShuffleBufferSize

The number of map segments merged into a single shuffle file is:

$$tNumSegInShuffleFile = \frac{tMergeSizeThr}{tSegmentUncomprSize}$$

If $(\lceil tNumSegInShuffleFile \rceil \times tSegmentUncomprSize \leq tShuffleBufferSize)$ $tNumSegInShuffleFile = \lceil tNumSegInShuffleFile \rceil$ else $tNumSegInShuffleFile = \lfloor tNumSegInShuffleFile \rfloor$ If ($tNumSegInShuffleFile > pInMemMergeThr$) $tNumSegInShuffleFile =$ $pInMemMergeThr$ If a Combiner is specified, then it is applied during the merging. If compression is enabled, then the (uncompressed) map segments are compressed after merging and before written to disk. Note also that if numMappers<tNumSegInShuffleFile, then merging does not happen. The size and number of records in a single shuffle file is:

$tShuffleFileSize =$ $tNumSegInShuffleFile \times tSegmentComprSize \times dsCombineSizeSel$ $tShuffleFileRecs = tNumSegInShuffleFile \times$ $tSegmentRecs \times dsCombineRecsSel$ $tNumShuffleFiles = \left\lfloor \frac{pNumMappers}{tNumSegInShuffleFile} \right\rfloor$ At the end of the merging process, some segments may remain in memory.

$t$NumSegmentsInMem=$p$NumMappers MOD $t$NumSegInShuffleFile

In case 2, the following equation can apply: tSegmetnUncomprSize≥0.25×tShuffleBufferSize. When a map segment is transferred directly to local disk, it becomes equivalent to a shuffle file. Hence, the corresponding temporary variables introduced in Case 1 above are:

$t$NumSegInShuffleFile=1

$t$ShuffleFileSize=$t$SegmentComprSize $t$ShuffleFileRecs=$t$SegmentRecs $t$NumShuffleFiles=$p$NumMappers $t$NumSegmentsInMem=0

Either case can create a set of shuffle files on disk. When the number of shuffle files on disk increases above a certain threshold (which equals 2×pSortFactor−1), a new merge thread is triggered and pSortFactor shuffle file are merged into a new and larger sorted shuffle file. The Combiner is not used during this so-called disk merging. The total number of such disk merges may be:

$$tNumShuffleMerges = \begin{cases} 0, & \text{if } tNumShuffleFiles < 2 \times pSortFactor - 1 \\ \left\lfloor \dfrac{tNumShuffleFiles - 2 \times pSortFactor + 1}{pSortFactor} \right\rfloor + 1, & \text{otherwise} \end{cases}$$

At the end of the Shuffle phase, a set of "merged" and "unmerged" shuffle files may exist on disk.

$t$NumMergShufFiles=$t$NumShuffleMerges $t$MergShufFileSize=$p$SortFactor×$t$ShuffleFileSize $t$MergShufFileRecs=$p$SortFactor×$t$ShuffleFileRecs $t$NumUnmergShufFiles=$t$NumShuffleFiles−($p$SortFactor×$t$NumShuffleMerges)

$t$UnmergShufFileSize=$t$ShuffleFileSize $t$UnmergShufFileRecs=$t$ShuffleFileRecs The total cost of the Shuffle phase includes cost for the network transfer, cost for any in-memory merging, and cost for any on-disk merging, as described above.

$tInMemMergeTime =$ $I(tSegmetnUncomprSize < 0.25 \times tShuffleBufferSize) \times$ $\Big[ dShuffleSize \times csIntermUncomCPUCost + tNumShuffleFiles \times$ $tShuffleFileRecs \times csMergeCPUCost + tNumShuffleFiles \times$ $tShuffleFileRecs \times csCombineCPUCost + tNumShuffleFiles \times$ $\dfrac{tShuffleFileSize}{dsIntermCompressRatio} \times csIntermComCPUCost \Big] +$ $tNumShuffleFiles \times tShuffleFileSize \times csLocalIOWriteCost$ $tOnDiskMergeTime = tNumMergeShufFiles \times$ $[tMergShufFileSize \times csLocalIOReadCost +$ $tMergShufFileSize \times csIntermUncomCPUCost +$ $tMergShufFileRecs \times csMergeCPUCost +$ $tMergShufFileSize \times csLocalIOWriteCost]$ $cShufflePhaseTime = dShuffle \times csNetworkCost +$ $tInMemMergeTime + tOnDiskMergeTime$ After map output data has been successfully transferred to the Reduce node, the Merge phase may begin. During this phase, the map output data can be merged into a single stream that is fed to the reduce function for processing. Similar to the Map's Merge phase, the Reduce's Merge phase may occur in multiple rounds. However, instead of creating a single output file during the final merge round, the data is sent directly to the reduce function.

The Shuffle phase may produce (i) a set of merged shuffle files on disk, (ii) a set of unmerged shuffle files on disk, and (iii) a set of map segment in memory. The total number of shuffle files on disk is:

$tNumShufFileOnDisk = tNumMergShufFiles + tNumUnmergShufFiles$

The merging in this phase may be done in three steps.

In step 1, some map segments may be marked for eviction from memory in order to satisfy a memory constraint enforced by the pReducerInBufPerc parameter, which specifies the amount of memory allowed to be occupied by the map segments before the reduce function begins.

$tMaxSegmetnBufferSize = pReducerInBufPerc \times pTaskMem$

The amount of memory currently occupied by map segments is:

$tCurrSegmentBufferSize = tNumSegmetnsInMem \times tSegmentUncomprSize$

Hence, the number of map segments to evict from, and retain in, memory are:

If ($tCurrSegmentsBufferSize > tMaxSegmetnBufferSize$)

$tNumSegmentsEvicted =$ $$\left\lceil \frac{tCurrSegmentBufferSize - tMaxSegmentBufferSize}{tSegmentUncomprSize} \right\rceil$$

else $tNumSegmentsEvicted = 0$ $tNumSegmentsRemainMem =$ $tNumSegmentsInMem - tNumSegmentsEvicted$ If the number of existing shuffle files on disk is less than pSortFactor, then the map segments marked for eviction can be merged into a single shuffle file on disk. Otherwise, the map segments marked for eviction are left to be merged with the shuffle files on disk during step 2 (i.e., step 1 does not happen).

If($tNumShufFilesOnDisk < pSortFactor$)

$tNumShufFilesFromMem = 1$ $tShufFilesFromMemSize = tNumSegmentsEvicted \times tSegmentComprSize$ $tShufFilesFromMemRecs = tNumSegmentsEvicted \times tSegmentRecs$ $tStep1MergingSize = tShufFilesFromMemSize$ $tStep1MergingRecs = tShufFilesFromMemRecs$ else $tNumShufFilesFromMem = tNumSegmentsEvicted$ $tShufFilesFromMem = tSegmentComprSize$ $tShufFilesFromMemRecs = tSegmentRecs$ $tStep1MergingSize = 0$ $tStep1MergingRecs = 0$ The total cost of step 1 (which could be zero) is:

$$cStep1Tiem = tStep1MergingRecs \times csMergeCPUCost + \frac{tStep1MergingSize}{dsIntermCompressRatio} \times csMergeCPUCost + tStep1MergingSize \times csLocalIOWriteCost$$

In step 2, any shuffle files that reside on disk can go through a merging phase in multiple merge rounds. This step can happen only if there exists at least one shuffle file on disk. The total number of files to merge during step 2 is:

$tFilesToMergeStep2 = tNumShufFilesOnDisk + tNumShufFilesFromMem$

The number of intermediate reads (and writes) are:

$tIntermMergeReads2 = calcNumSpillsIntermMerge$
$(tFilesToMergeStep2, pSortFactor)$ The main difference from previous examples is that the merged files in this case have different sizes. The different sizes can be accounted for by attributing merging costs proportionally. Hence, the total size and number of records involved in the merging process during step 2 are:

$tStep2MergingSize =$ $\frac{tIntermMergeReads2}{tFilestoMergeStep2} \times [tNumMergeShufFiles \times tMergeShufFileSize +$ $tNumUnmergShufFiles \times tUnmergShufFileSize +$ $tNumShufFilesFromMem \times tShufFilesFromMemSize]$ $tStep2MergingSize = \frac{tIntermMergeReads2}{tFilesToMergeStep2} \times$ $[tNumMergeShufFiles \times tMergeShufFileRecs +$ $tNumUnmergSufFiles \times tUnmergShufFileRecs +$ $tNumShufFilesFromMem \times tShufFilesFromMemRecs]$ The total cost of step 2 (which could also be zero) is:

$cStep2Time = tStep2MergingSize \times csLocalIOReadCost +$ $tStep2MergingSize \times cIntermUncomprCPUCost +$ $tStep2MergingRecs \times csMergeCPUCost +$ $\frac{tStep2MergingSize}{dsIntermCompressRatio} \times csIntermComCPUCost +$ $tStep2MergingSize \times csLocalIOWriteCost$ In step 3, all files on disk and in memory may be merged together. The process identical or similar to step 2 above. The total number of files to merge during step 3 is:

$$tFilestoMergeStep3 = tNumSegmentsRemainMem + \\ calcNumSpillsFinalMerge(tFilesToMergeStep2, pSortFactor)$$

The number of intermediate reads (and writes) is:

$t$IntermMergeReads3=calcNumSpillsIntermMerge
($t$FilesToMergeStep3,$p$SortFactor)

Hence, the total size and number of records involved in the merging process during step 3 are:

$$tStep3MergingSize = \frac{tIntermMergeReads3}{tFilesToMergeStep3} \times dShuffleSize$$

$$tStep3MergingRecs = \frac{tIntermMergeReads3}{tFilesToMergeStep3} \times dShuffleRecs$$

The total cost of step 3 (which could also be zero) is:

$$cStep3Time = tStep3MergingSize \times csLocalIOReadCost + \\ tStep3MergingSize \times cIntermUncomprCPUCost + \\ tStep3MergingRecs \times csMergeCPUCost + \\ \frac{tStep3MergingSize}{dsIntermCompressRatio} \times csIntermComCPUCost + \\ tStep3MergingSize \times csLocalIOWriteCost$$

The total cost of the Merge phase is:

$c$MergePhaseTiem=$c$Step1$Time$+$c$Step2Time+
$c$Step3Time

Further, the user-defined reduce function can be processed with the merged intermediate data to produce an output that can be written to HDFS. The size and number of records processed by the reduce function is:

$$dReduceInBytes = \frac{tNumShuffleFiles \times tShuffleFileSize}{dsIntermCompressRatio} + \\ \frac{tNumSegmentsInMem \times tSegmentComprSize}{dsIntermCompressRatio}$$

The size and number of records produced by the reduce function is:

$d$ReduceOutBytes=$d$ReduceInBytes×$ds$ReduceSizeSel $d$ReduceOutRecs=$d$ReduceInRecs×$ds$ReduceRecsSel The input data to the reduce function may reside in both memory and disk, as produced by the Shuffle and Merge phases.

$$tInRedFromDiskSize = tNumMergShufFiles \times tMergShufFileSize + \\ tNumUnmergShufFiles \times tUnmergShufFileSize + \\ tNumShufFilesFromMem \times tShufFilesFromMemSize$$

The total cost of the Reduce phase is:

$$cReducePhaseTime = tInRedFromDiskSize \times csLocalIOReadCost + \\ tInRedFromDiskSize \times cIntermUncompCPUCost + \\ dReduceInRecs \times csReduceCPUCost$$

The total cost of the Write phase is:

$$cWritePhaseTime = dReduceOutBytes \times csOutComprCPUCost + \\ dReduceOutBytes \times dsOutCompressRatio \times csHdfsWriteCost$$

A MapReduce job execution may include several map and reduce tasks executing in parallel and in waves. There are two primary ways to estimate the total execution time of the job: (i) simulate the task execution using a Task Scheduler, and (ii) calculate the expected total execution time analytically.

Simulation involves scheduling and simulating the execution of individual tasks on a virtual cluster. One simple way for estimating the cost for each task is to sum up the estimated cost fields. The overall cost for a single map task is:

$$totalMapTime = \begin{cases} cReadPhaseTiem + cMapPhaseTime + cWritePhaseTime, \text{ if } pNumReducers = 0 \\ cReadPhaseTime + cMapPhaseTime + cCollectPhaseTime + cSpillPhaseTime + cMergePhaseTime, \text{ if } pNumReducers > 0 \end{cases}$$

The overall cost for a single reduce task is:

$$totalReduceTime = cShufflePhaseTime + \\ cMergePhaseTime + cReducePhaseTime + cSpillPhaseTime$$

A second approach for calculating the total job execution time involves using the following analytical estimates:

$$totalMapsTime = \frac{pNumMappers \times totalMapTime}{pNumNodes \times pMaxMapsPerNode}$$

$$totalReducesTime = \frac{pNumReducers \times totalReduceTime}{pNumNodes \times pMaxRedPerNode}$$

The overall job cost is the sum of the costs from all the map and the reduce tasks, as expressed in the following equation:

$$totalJobTime = \\ \begin{cases} totalMapsTime, \text{ if } pNumReducers = 0 \\ totalMapsTime + totalReducesTime, \text{ if } pNumReducers > 0 \end{cases}$$

The virtual job profile contains detailed dataflow and cost information estimated at the task and phase level for the hypothetical job j2. The what-if engine can use a task scheduler simulator, along with the job profiles and information on the cluster resources, to simulate the scheduling and execution of map and reduce tasks in j2 as shown in FIG. 7. The task scheduler simulator is a pluggable component that takes into account the dataflow and resource dependencies in one or more MapReduce jobs.

A final output—after job execution has been simulated—may be a description of the complete (hypothetical) job execution in the cluster. The answer to the what-if question (e.g., predicted running time, amount of local I/O, a visualization of the task execution timeline, and the like) may be available from the simulated execution.

Figure 9:
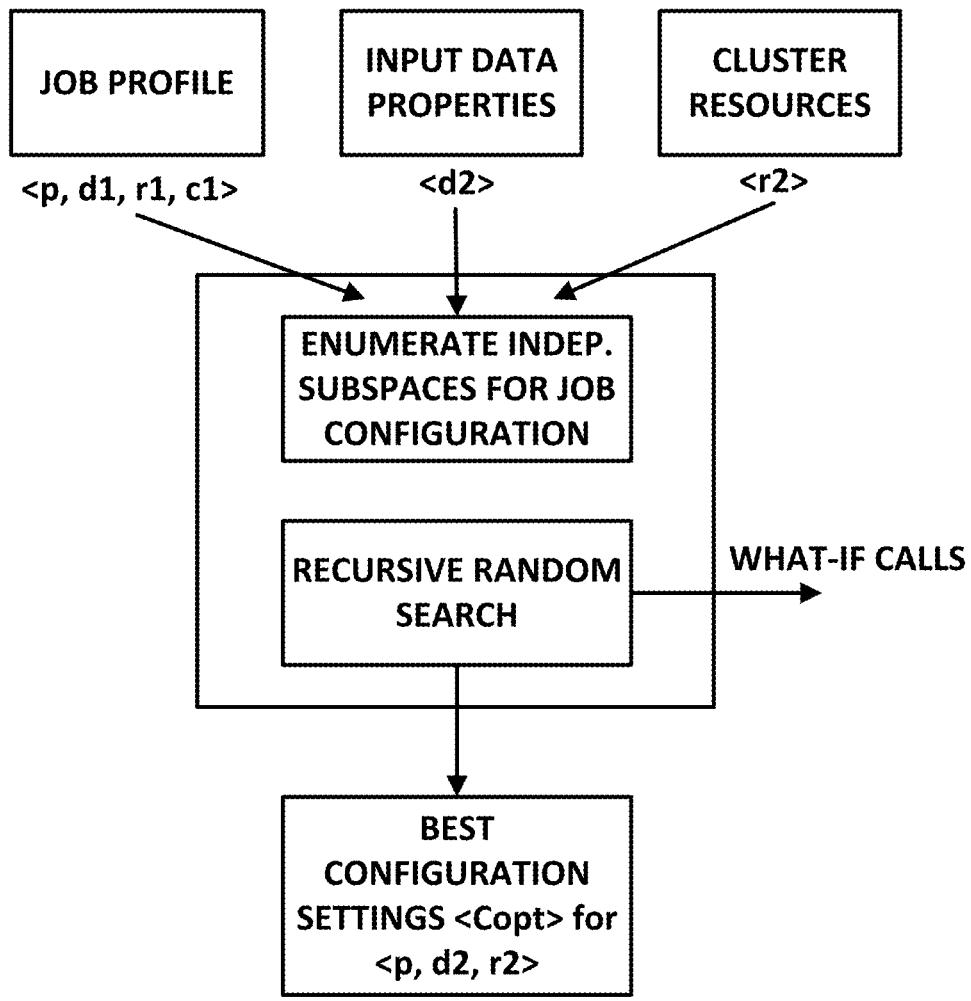
FIG. 9 is a flowchart showing an example method for finding the best job configuration settings by a job configuration recommender.

A job configuration recommender for a MapReduce job can be used to solve the following problem: Given a MapReduce program p to be run on input data d and cluster resources r, find the setting of configuration parameters that gives the best performance as predicted by a what-if engine over the full space S of configuration parameter settings. FIG. 9 illustrates a block diagram of an example job configuration recommender in accordance with embodiments of the present disclosure. The job configuration recommender can be used to address the problem by making what-if calls with settings of the configuration parameters selected through an enumeration and search over the space S. For providing both efficiency and effectiveness, the job configuration recommender must minimize the number of what-if calls while finding near-optimal configuration settings. The what-if engine may need as input a job profile for the MapReduce program p. In an example case, this profile is already available when p has to be optimized. The program p may have been profiled previously on input data d' and cluster resources r' which have the same properties as the current d and r respectively. If a profile is not already available, then the profiler can be used to generate a profile quickly using sampling.

An example approach that the job configuration recommender may take is to apply enumeration and search techniques to the full space of configuration parameter settings S. However, the high dimensionality of S affects the scalability of this approach. More efficient search techniques can be provided by grouping individual parameters in c into clusters, denoted $c_i$ such that the globally-optimal setting $C_{opt}$ in S can be composed from the optimal settings for the clusters. That is, the globally-optimal setting can be found using a divide and conquer approach by: (i) breaking the higher-dimensional space S into lower-dimensional subspaces; (ii) considering an independent optimization problem in each smaller subspace; and (iii) composing the optimal parameter settings found per subspace to give the globally-optimal setting.

MapReduce may give a natural clustering of parameters into two clusters: parameters that predominantly affect map task execution, and parameters that predominantly affect reduce task execution. For example, Hadoop's io.sort.mb parameter only affects the Spill phase in map tasks, while mapred.job.shuffle.merge.percent only affects the Shuffle phase in reduce tasks. The two subspaces for map tasks and reduce tasks respectively can be optimized independently. The lower dimensionality of the subspaces decreases the overall time required for tuning drastically.

Some parameters may have small and finite domains, e.g., Boolean is true or false. At the other extreme, the job configuration recommender has to narrow down the domain of any configuration parameter whose domain is unbounded. In these cases, the job configuration recommender may use information from the job profile and the cluster resources. For example, the job configuration recommender may use the maximum heap memory available for map task execution, along with the program's memory requirements (predicted based on the job profile), to bound the range of io.sort.mb values that can contain the optimal setting.

A second step of the job configuration recommender involves searching within each enumerated subspace to find the optimal configuration in the subspace. Gridding is a simple technique to generate points in a space with n parameters. The domain dom($c_i$) of each configuration parameter $c_i$ may be discretized into k values. The values may be equispaced or chosen randomly from dom($c_i$). Thus, the space S of possible settings is discretized into a grid. The job configuration recommender makes a call to a what-if engine for each setting from this grid, and selects the setting with the best predicted job performance.

Recursive Random Search (RRS) is a technique to solve optimization problems. RRS first samples the subspace randomly to identify promising regions that contain the optimal setting with high probability. It may then samples recursively in these regions which either move or shrink gradually to locally-optimal settings based on the samples collected. RRS then restarts random sampling to find a more promising region to repeat the recursive search. RRS may be used for three important reasons: (a) RRS provides probabilistic guarantees on how close the setting it finds is to the optimal setting; (b) RRS is fairly robust to deviations of predicted costs from actual observed performance; and (c) RRS scales to a large number of dimensions.

Thus, there are two choices for subspace enumeration: full or clustered, that deal respectively with the full space or smaller subspaces for map and reduce tasks; and three choices for search within a subspace: gridding (Equispaced or Random) and RRS.

A cluster sizing recommender for a MapReduce job has to solve the following problem: Given one or more MapReduce programs p to be run on input data d, find the settings of configuration parameters and cluster resources that gives the best performance as predicted by the what-if engine over the full space Sj of configuration parameter settings and cluster resources.

Figure 10:
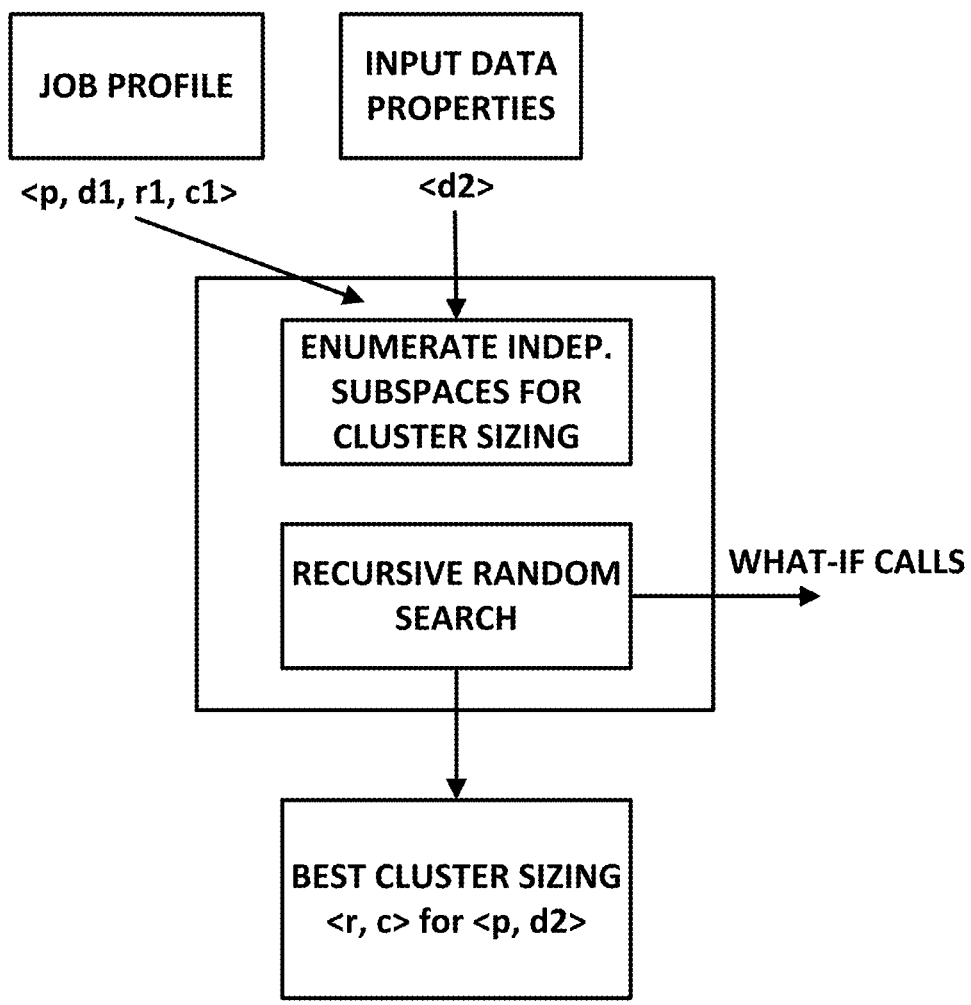
FIG. 10 is a flowchart showing an example method for finding the best cluster sizing and job configuration setting by a cluster sizing recommender.

The full space Sj of configuration parameter settings and cluster resources adds many more dimensions to the full space S of configuration parameter settings only. The newly added dimensions include number of machines in the cluster that runs the MapReduce system, the types of machines in this cluster, the number of map task slots in machines in this cluster, the number of reduce task slots in machines in this cluster, the amount of memory available per task slot in the cluster, and the like. This problem may be addressed, for example, by a cluster sizing recommender, which is illustrated by the block diagram of FIG. 10. The cluster sizing recommender can address this problem by making what-if calls through an enumeration and search over the space Sj. Like the job configuration recommender, for providing both efficiency and effectiveness, the cluster sizing recommender must also minimize the number of what-if calls while finding near-optimal settings. Like the job configuration recommender, the cluster sizing recommender may use RRS, except that the cluster sizing recommender does an enumeration and search over the space Sj instead of the space S.

In accordance with embodiments, a visualizer is a graphical interface or other user interface tool that users may employ to help users understand the operation of a MapReduce system, and assist users with diagnosing and tuning (or controlling) the MapReduce system. A user may use the visualizer during execution for (a) a better understanding and problem diagnosis; (b) asking hypothetical questions on how the job and cluster behavior can change when parameter settings, cluster resources, or input data properties change; and (c) ultimately tune jobs and clusters. Example core functionalities of the visualizer may be characterized as job analysis, what-if analysis, and optimization. For each functionality, the visualizer can offer five different views: (1) timeline views, used to visualize the progress of job execution at the task level; (2) data-skew views, used to identify the presence of data skew in the input and output data for map and reduce; (3) data-flow views, used to visualize the flow of data among the nodes of a MapReduce cluster, and between the map and reduce tasks of a job; (4) profile views, used to show the detailed information exposed by the job profiles, including the phase timings within the tasks; and (5) settings views, used to list the configuration parameter settings, cluster setup, and the input data properties during job execution. The user can obtain deep insights into a job's and cluster's performance from each view.

Figure 11:
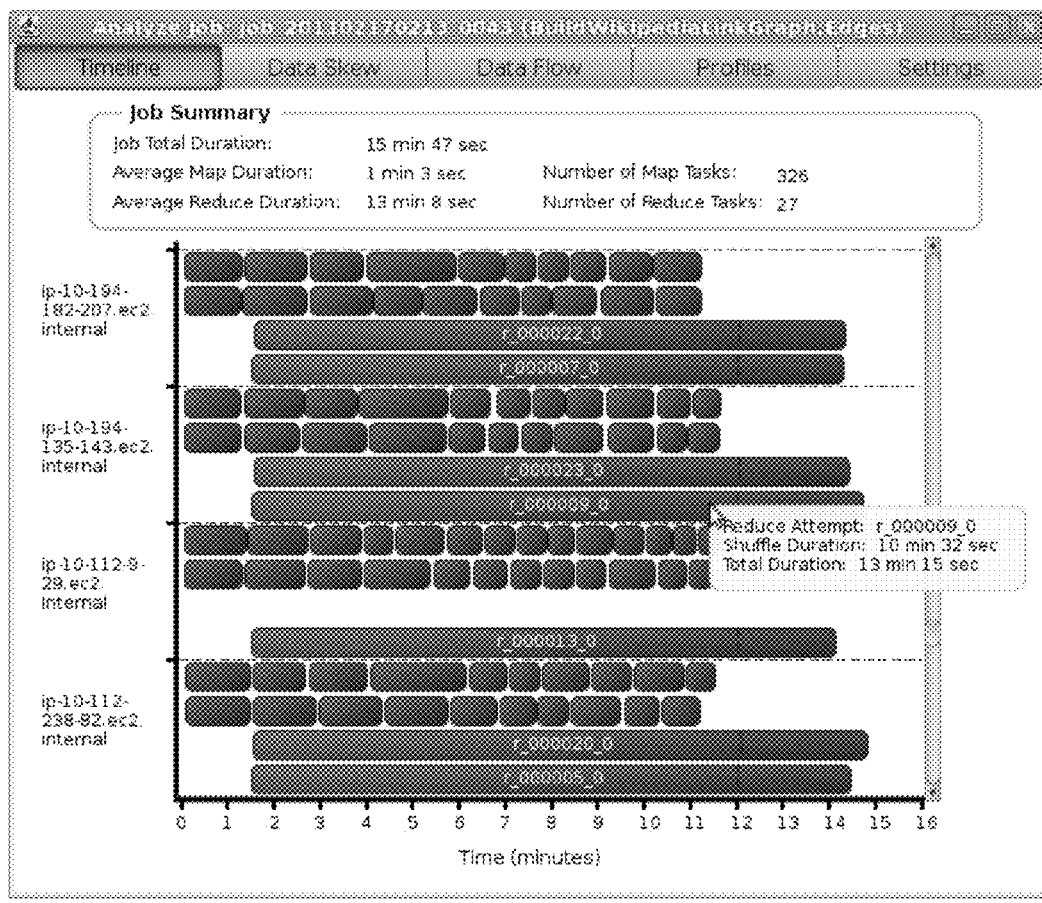
FIG. 11 is an example screenshot made available by a visualizer for showing an execution timeline of map and reduce tasks of a MapReduce job in a cluster running EC2 in accordance with embodiments of the present disclosure.

When a MapReduce job executes on a HADOOP® cluster, for example, the profiler may collect a wealth of information including logs, counters, resource utilization metrics, and other profiling data. This information can help a user with understanding the job behavior as well as identifying bottlenecks during the job execution. FIG. 11 illustrates an example screenshot made available by a visualizer in accordance with embodiments of the present disclosure. Referring to FIG. 11, the screenshot shows the execution timeline of map and reduce tasks that ran during a MapReduce job execution. The visualizer can allow a user to get information such as how many tasks were running at any point in time on each node, when each task started and ended, or how many map or reduce waves occurred during job execution. The user is able to quickly spot any high variance in the task execution times, and discover potential load-balancing issues.

In accordance with embodiments, a visualizer can provide timeline views that can be used to compare different executions of the same job run at different times or with different parameter settings. Comparison of timelines shows whether the job behavior changed over time, as well as helps understand the impact of changing parameter settings on job execution.

Figure 13:
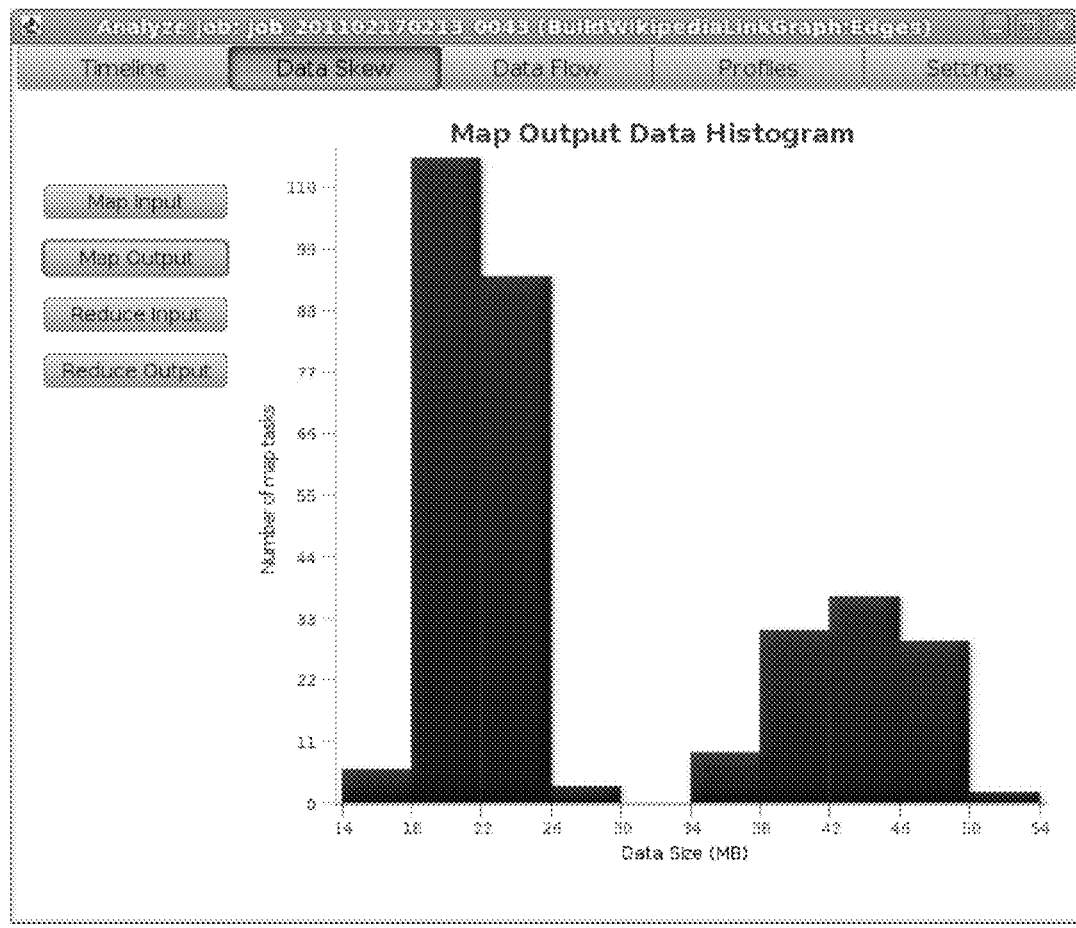
FIG. 13 is an example screenshot made available by a visualizer for showing a histogram of the data skew of map output produced by a MapReduce job in accordance with embodiments of the present disclosure.

While the timeline views are useful in identifying computational skew, the data-skew view is shown in FIG. 13, which illustrates an example screenshot made available by a visualizer in accordance with embodiments of the present disclosure. This screenshot can be used to help a user to readily identify the presence of skew in the data consumed and produced by the map and reduce tasks. Data skew in the reduce tasks usually indicates a strong need for a better partitioner in a MapReduce job. Data skew in the map tasks corresponds to properties of the input data, and may indicate the need for a better partitioner in the producer job that generates the input data.

Figure 12:
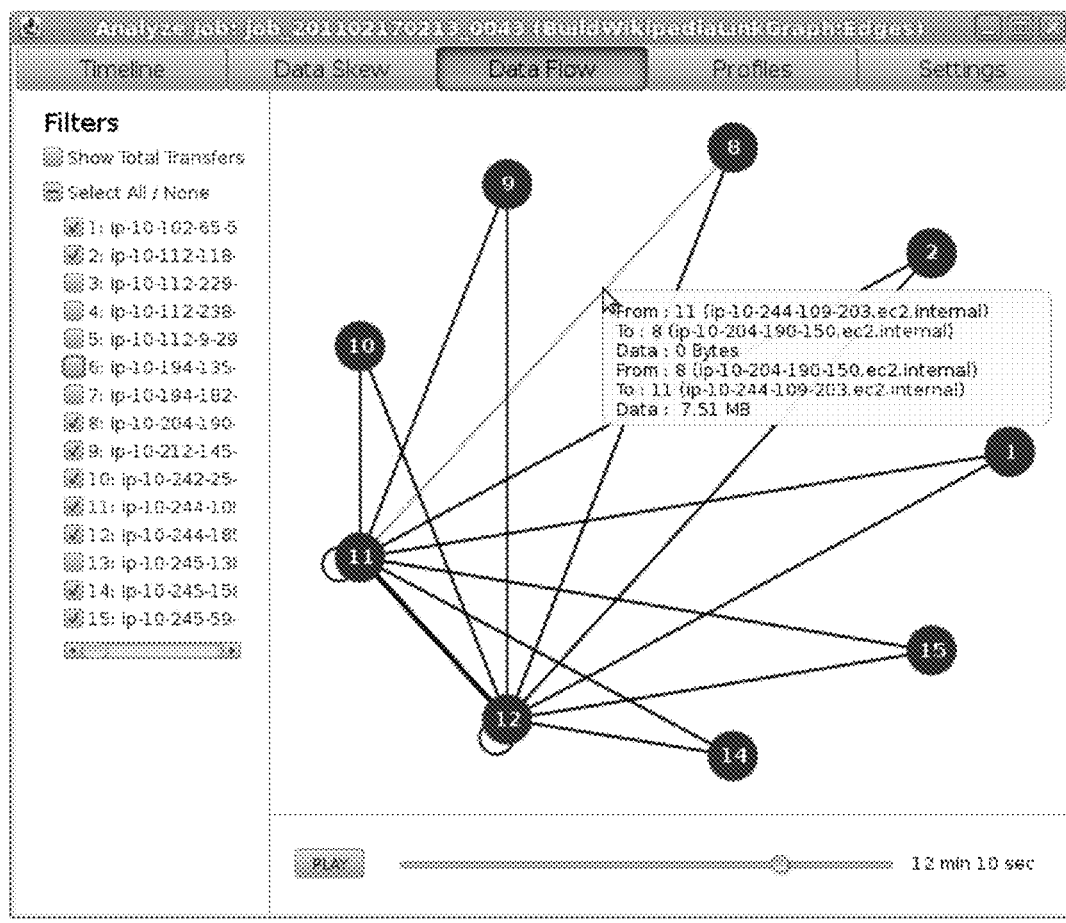
FIG. 12 is a screenshot showing the data flow among the nodes during the execution of a MapReduce job in accordance with embodiments of the present disclosure.

Data-skew views can be complemented by the data-flow views used to identify data skew across the HADOOP® nodes. FIG. 12 illustrates a screenshot showing the data flow among the nodes during the execution of a MapReduce job in accordance with embodiments of the present disclosure. The thickness of each line is proportional to the amount of data that was shuffled between the corresponding nodes. The user also has the ability to specify a set of filter conditions (see the left side of FIG. 12) that allows her to zoom in on a subset of nodes or on the large data transfers.

A beneficial feature of the visualizer is a video mode that allows users to play back a job execution from the past to visualize changes over time. Using the video mode, the user can inspect how data was processed and transferred between the map and reduce tasks of the job, and among nodes and racks of the cluster, as time went by.

Figure 14:
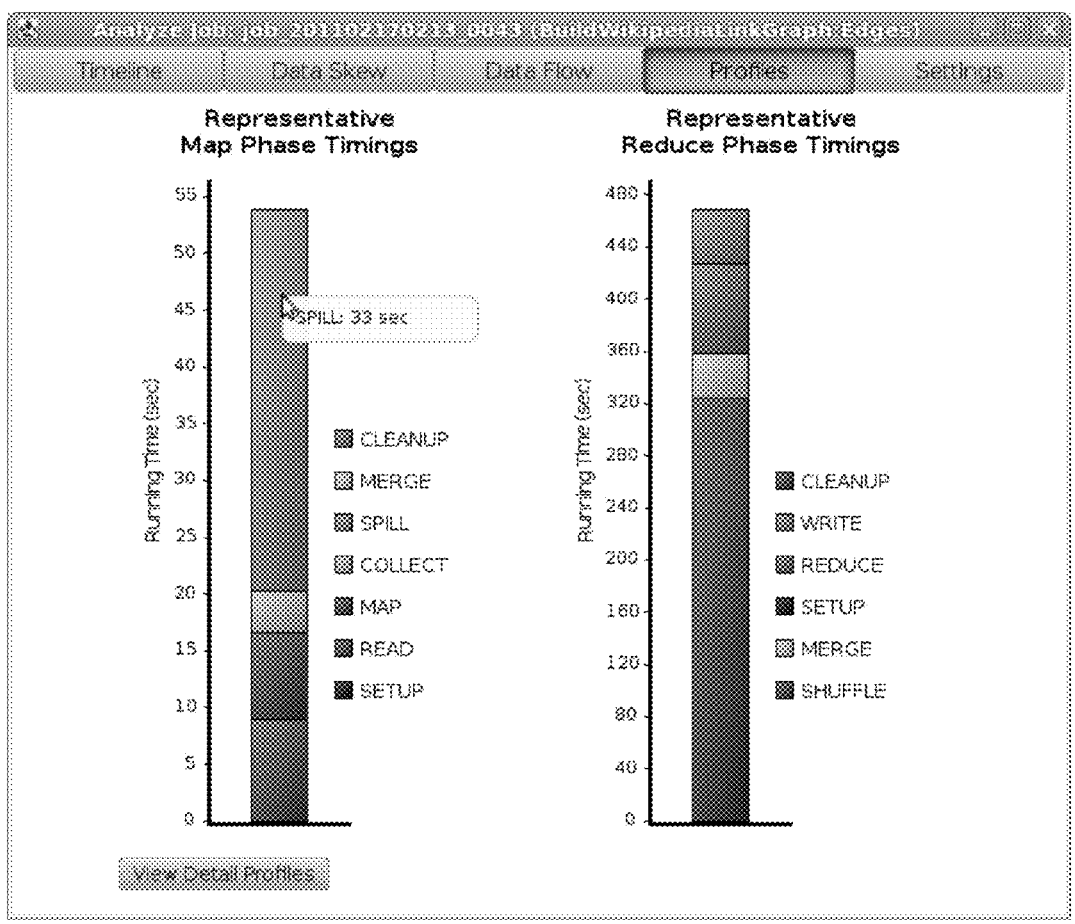
FIG. 14 is a screenshot showing the breakdown of execution time among task phases in map and reduce tasks for a MapReduce job in accordance with embodiments of the present disclosure.

Profile views can help a user to visualize the job profiles, namely, the information exposed by the profile fields at the fine granularity of phases within the map and reduce tasks of a job to allow for an in-depth analysis of the task behavior during execution. For example, FIG. 14 illustrates a screenshot showing the breakdown of time spent on average in each map and reduce task. The profile views also form an excellent way of diagnosing bottlenecks during task execution. It stands out in FIG. 14 that the time spent spilling the map output data at the map tasks contributes the most to the total execution time; indicating that the corresponding configuration parameters have settings that are potentially suboptimal.

Figure 15:
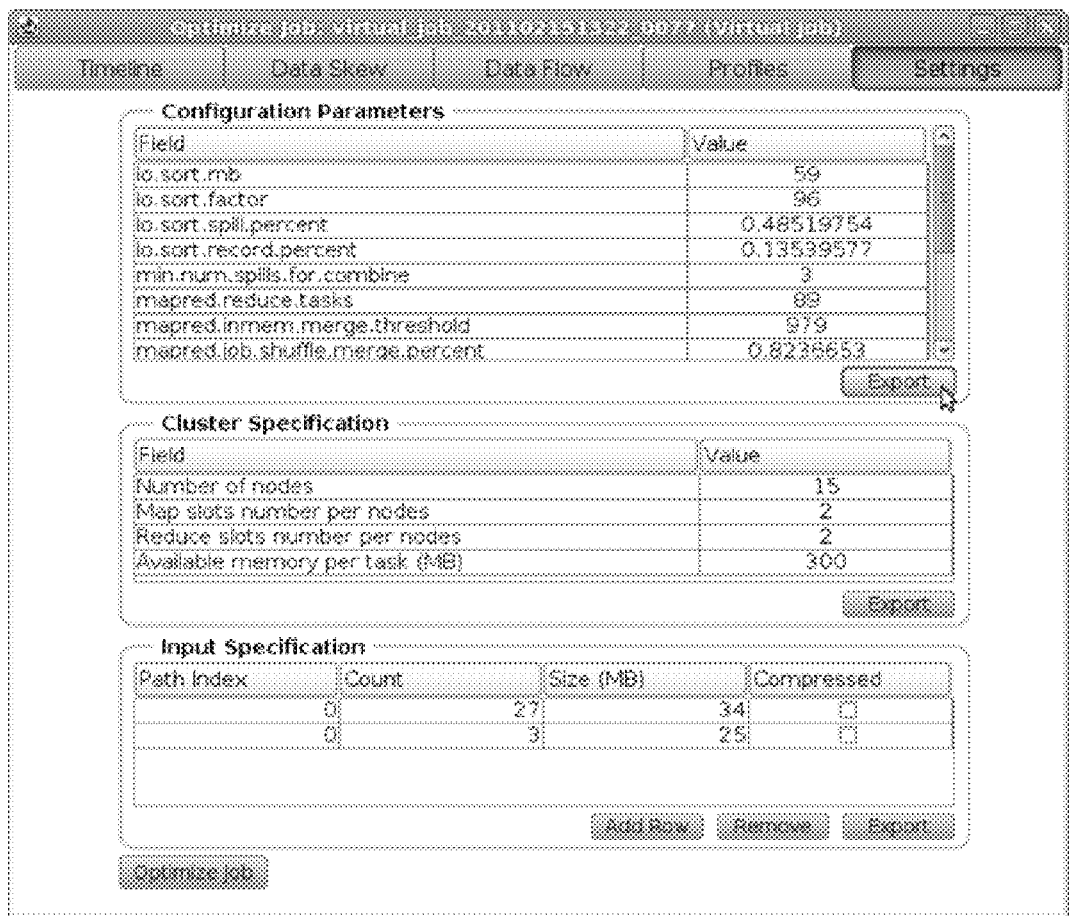
FIG. 15 is a screenshot showing the optimal configuration settings found by a job configuration recommender as well as cluster resources and input data specifications in accordance with embodiments of the present disclosure.

FIG. 15 illustrates a screenshot showing a setting view that lists the most important configuration parameters used during the execution of a MapReduce job, as well as the cluster setup and input data properties. The cluster setup is summarized as the number of nodes, the average number of map and reduce slots per node, and the memory available for each task execution. The input data properties include the size and compression of each input split processed by a single map task. The user also has the option of exporting any of the above settings in XML or other formats.

Another example core functionality that may be provided by a visualizer is the ability to answer hypothetical questions about the behavior of a MapReduce job when run under different settings. This functionality allows users to study and understand the impact of configuration parameter settings, cluster setup, and input data properties on the performance of a MapReduce job. For example, the user can ask a what-if question of the form: "How will the execution time of a job change if the number of reduce tasks is doubled?" The user can then use the timeline view to visualize what the execution of the job will look like under the new settings, and compare it to the current job execution. By varying the number of reducers (or any other configuration parameter), the user can determine the impact of changing that parameter on the job execution. The visualizer may invoke the what-if engine to generate a virtual job profile for the job in the hypothetical setting as shown in FIG. 2. Furthermore, the user can investigate the behavior of MapReduce jobs when changing the cluster setup or the input specification. This functionality is useful in two scenarios. First, many organizations run the same MapReduce programs over multiple datasets with similar data distribution, but different sizes. For example, the same report-generation MapReduce program may be used to generate daily, weekly, and monthly reports. Or, the daily log data collected and processed may be larger for a weekday than the data for the weekend. By modifying the input specification, the user can ask what-if questions on the job behavior when the job is run using datasets of different sizes.

Another example use case is the presence of a development/test cluster for generating job profiles. In many companies, developers use a small test cluster for testing and debugging MapReduce programs over small (representative) datasets before running the programs, possibly multiple times, on the production cluster. Again, the user can modify the cluster setup in order to determine in advance how the jobs will behave on the production cluster. These capabilities are immensely useful in HADOOP® deployments.

Another example benefit of the functionality of a visualizer comes from how it can use the recommenders to find good configuration settings for executing a MapReduce job on a HADOOP® cluster. The user can then export the configuration settings as an XML file that is used when similar jobs have to be run in future. At the same time, the user can examine the behavior of the optimal job through the other views provided by the visualizer. Similar to the what-if analysis functionality, the user can modify the cluster and input specifications before optimizing a MapReduce job. Hence, the user can obtain good configuration settings for the same MapReduce program executed over different input datasets and different clusters (per the two usage scenarios presented earlier). In addition, the user can take advantage of the sampling capabilities of the profiler to quickly collect a job profile on a sample of the input data. The user can then modify the input specifications and find the optimal settings to use when executing the MapReduce program over the full (or a different) dataset.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs may be implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
   at a processor and memory:
   collecting monitoring data during execution of a MapReduce job comprising a first set of configuration settings on a MapReduce framework,
   wherein collecting the monitoring data comprises applying dynamic instrumentation to the MapReduce job and the MapReduce framework during execution of the MapReduce job on the MapReduce framework,
   wherein applying dynamic instrumentation comprises applying a specified set of event-condition-action (ECA) rules to the MapReduce framework, and
   wherein an event comprises at least one of a entry function, exit function, memory allocation, system call event occurring during execution of the MapReduce job on the MapReduce framework;
   generating dataflow fields and cost fields of a job profile of the MapReduce job based on the collected monitoring data; and
   communicating the job profile to a prediction process configured to predict the behavior of the MapReduce job comprising a second set of configuration settings on the MapReduce framework using the job profile.

2. The method of claim 1, wherein collecting monitoring data comprises receiving one of a dataflow measure, an execution time measure, and a resource usage measure during execution of the MapReduce job on the MapReduce framework.

3. The method of claim 1, wherein collecting monitoring data comprises receiving run-time monitoring information from the MapReduce job and MapReduce framework during execution of the MapReduce job on the MapReduce framework.

4. The method of claim 1, wherein the data flow fields of the job profile comprises dataflow information associated with the collected monitoring data of the MapReduce job.

5. The method of claim 4, wherein the dataflow information comprises one of a size of data and I/O transfer processed during execution of the MapReduce job.

6. The method of claim 1, wherein the cost fields of the job profile comprise cost information associated with the collected monitoring data of the MapReduce job.

7. The method of claim 6, wherein the cost information comprises one of resource usage and execution time associated with the collected monitoring data of the MapReduce job.

8. The method of claim 1, wherein the job profile fields comprises one of a dataflow statistics field and a cost statistic field.

9. The method of claim 1, wherein using the job profile comprises using the job profile to simulate execution of the MapReduce job on the MapReduce framework, the second set of configuration settings of the MapReduce job being different from the first set of configuration settings used to collect the monitoring data.

10. The method of claim 1, wherein the MapReduce job comprises map tasks and reduce tasks.

11. The method of claim 1, wherein an action comprises at least one of obtaining the duration of a function call, examining the memory state, and counting the number of bytes transferred during execution of the MapReduce job on the MapReduce framework.

12. The method of claim 1, wherein at least one of the dataflow fields comprises the amount of data flowing through at least one task phase during the execution of the MapReduce job on the MapReduce framework.

13. A computing device comprising:
a processor and memory configured to:
collect monitoring data during execution of a MapReduce job comprising a first set of configuration settings on the MapReduce framework,
wherein collecting the monitoring data comprises applying dynamic instrumentation to the MapReduce job and the MapReduce framework during execution of the MapReduce job on the MapReduce framework,
wherein applying dynamic instrumentation comprises applying a specified set of event-condition-action (ECA) rules to the MapReduce framework, and
wherein an event comprises at least one of a entry function, exit function, memory allocation, system call event occurring during execution of the MapReduce job on the MapReduce framework;
generate dataflow fields and cost fields of a job profile based on the collected monitoring data; and
communicate the job profile to a prediction process configured to predict the behavior of the MapReduce job comprising a second set of configuration settings on the MapReduce framework using the job profile.

* * * * *